US009093109B2

(12) United States Patent
Nagasawa

(10) Patent No.: US 9,093,109 B2
(45) Date of Patent: Jul. 28, 2015

(54) LIBRARY DEVICE, LIBRARY CONTROL METHOD, AND COMPUTER READABLE RECORDING MEDIUM

(71) Applicant: NEC Corporation, Minato-ku, Tokyo (JP)

(72) Inventor: Makoto Nagasawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/524,158

(22) Filed: Oct. 27, 2014

(65) Prior Publication Data

US 2015/0117992 A1    Apr. 30, 2015

(30) Foreign Application Priority Data

Oct. 25, 2013   (JP) ................................. 2013-222389

(51) Int. Cl.
 *G11B 15/68*    (2006.01)
 *G11B 15/675*    (2006.01)
(52) U.S. Cl.
 CPC .......... *G11B 15/6835* (2013.01); *G11B 15/675* (2013.01); *G11B 15/689* (2013.01)
(58) Field of Classification Search
 CPC .... G11B 17/22; G11B 15/68; G11B 15/6835; G11B 17/225; G11B 15/689; G11B 27/002

USPC ......................................................... 360/92.1
See application file for complete search history.

(56) References Cited

U.S. PATENT DOCUMENTS

| 6,262,863 | B1 * | 7/2001 | Ostwald et al. .............. 360/92.1 |
| 8,213,108 | B2 * | 7/2012 | Noguchi et al. ............. 360/92.1 |
| 8,611,042 | B2 * | 12/2013 | Schmidtke et al. .......... 360/92.1 |
| 8,675,302 | B2 * | 3/2014 | Hashimoto .................. 360/92.1 |

FOREIGN PATENT DOCUMENTS

JP            7-21644  A       1/1995

* cited by examiner

*Primary Examiner* — Wayne Young
*Assistant Examiner* — Mark Blouin
(74) *Attorney, Agent, or Firm* — Sughrue Mion, PLLC

(57) ABSTRACT

A library device includes cell units which include a plurality of cells each configured to hold a cartridge, the cell units being loaded in a rack in a state where the cell units are arranged at least along a width direction of the rack to be capable of sliding out of the rack, and a robot adjacent to the rack holding the cell units. The robot includes a first mechanism of moving the robot at least along the width direction, a second mechanism of pulling out or loading the cell units from or into the rack, and a third mechanism of unloading or loading the cartridge from or into one of the cells while the cell unit is pulled out, and loading or unloading the cartridge into or from a drive operating the cartridge.

10 Claims, 36 Drawing Sheets

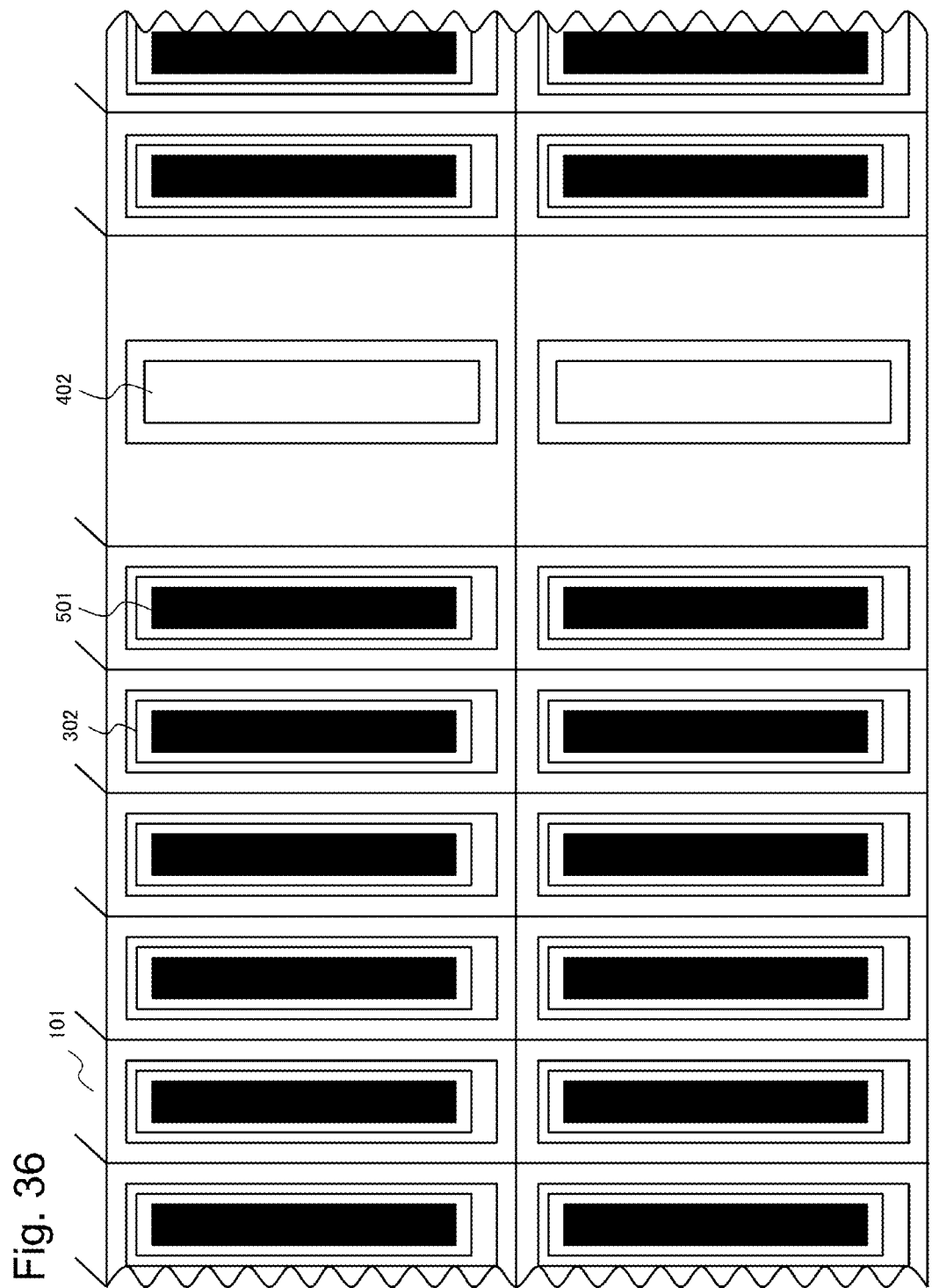

LIBRARY DEVICE, LIBRARY CONTROL METHOD, AND COMPUTER READABLE RECORDING MEDIUM

This application is based upon and claims the benefit of priority from Japanese Patent Application No. 2013-222389, filed on Oct. 25, 2013, the disclosure of which is incorporated herein in its entirety by reference.

TECHNICAL FIELD

The present invention relates to a library device holding a large number of cartridges, a library control method, and a computer readable recording medium therefor.

BACKGROUND ART

A library device that holds a large number of cartridges is known. The library device has a configuration in which a plurality of cartridges, each holding a recording medium, and drives are mounted in a rack. The library device includes a robot for retrieving a cartridge and loading the cartridge into a drive. The robot moves to the location of a target cartridge, unloads the cartridge, then moves to the location of a target drive, and loads the cartridge into the drive.

FIG. 36 illustrates an example of a library device according to a typical related art. Cells 302, holding cartridges 501, and drives 402 are installed in a rack of a library device 101 illustrated in FIG. 36. A robot, not depicted, takes a cartridge 501 from a cell 302 and loads the cartridge 501 into a drive 402.

Another example of a library device is described in Japanese Laid-Open Patent Publication No. H07-021644. In the library device described in Japanese Laid-Open Patent Publication No. H07-021644, video cassette tapes are held in a rack. Grippers move in the width direction and the height direction of the rack and unload a video cassette tape. The rack is separated into two layers in the depth direction and video cassette tapes can be held in each layer in the depth direction. When unloading a tape from the back (the second layer), a first gripper pulls out a tape from the first layer at the front and a second gripper pulls out the target tape from the back (the second layer).

However, increasing the load capacity of the library device described above and illustrated in FIG. 36 requires extending the width of the library device, which results in a long travel distance of the robot. An increased travel distance entails increases in the lengths of cables for supplying power and signals to the robot. As a result, supply voltage and signal quality decrease, which can lower the stability of operation. Furthermore, since the whole width of the library device increases, the flexibility of installation is reduced.

In addition, in the technique described in aforementioned Japanese Patent Laid-Open Publication No. H07-021644, as many grippers as the number of cartridges held in the depth direction of the rack need to be provided and a cartridge in the front needs to be picked up before picking up a cartridge in the back. Accordingly, the technique described in Japanese Patent Laid-Open No. H07-021644 can only hold as many cartridges as the number of grippers in the depth direction of the rack. Moreover, as the number of cartridges held in the back increases, the number of pickup operations increases, thereby consuming the time required for unloading and loading cartridges.

SUMMARY

An object of the present invention is to provide a library device, a library control method and a computer readable recording medium that are capable of solving the problems described above.

A library device according to an exemplary aspect of the invention includes:

cell units each including a plurality of cells each configured to hold a cartridge, the cell units being loaded in a rack in a state where the cell units are arranged at least along a width direction of the rack to be capable of sliding out of the rack; and a robot adjacent to the rack holding the cell units.

The robot is configured with a first mechanism of moving the robot at least along the width direction, a second mechanism of pulling out or loading the cell units from or into the rack, and a third mechanism of unloading or loading the cartridge from or into one of the cells while the cell unit is pulled out, and loading or unloading the cartridge into or from a drive operating the cartridge.

In a library control method for a library device that is provided with cell units each including a plurality of cells each configured to hold a cartridge, the cell units being loaded in a rack in a state where the cell units are arranged at least along a width direction of the rack to be capable of sliding out of the rack, and a robot adjacent to the rack holding the cell units, the library control method according to an exemplary aspect of the invention includes:

moving the robot at least along the width direction;

pulling out or loading one of the cell units from or into the rack; and unloading or loading the cartridge from or into one of the cells while the cell unit is pulled out, and loading or unloading the cartridge into or from a drive operating the cartridge.

A computer readable non-transitory recording medium according to an exemplary aspect of the invention for storing a computer program, causing a computer of a library device that is provided with cell units each including a plurality of cells each configured to hold a cartridge, the cell units being loaded in a rack in a state where the cell unit are arranged at least along a width direction of the rack to be capable of sliding out of the rack, and a robot adjacent to the rack holding the cell units, to execute the steps of:

controlling a first mechanism of moving the robot at least along the width direction;

controlling a second mechanism of pulling out or loading the cell units from or into the rack; and controlling a third mechanism of unloading or loading the cartridge from or into one of the cells while the cell unit is pulled out, and loading or unloading the cartridge into or from a drive operating the cartridge.

BRIEF DESCRIPTION OF THE DRAWINGS

Exemplary features and advantages of the present invention will become apparent from the following detailed description when taken with the accompanying drawings in which:

FIG. 36 is a schematic diagram illustrating an example of a library device according to the background art.

EXEMPLARY EMBODIMENT

Exemplary embodiments of the present invention will be described below with reference to drawings.

First Exemplary Embodiment

Figure 1:
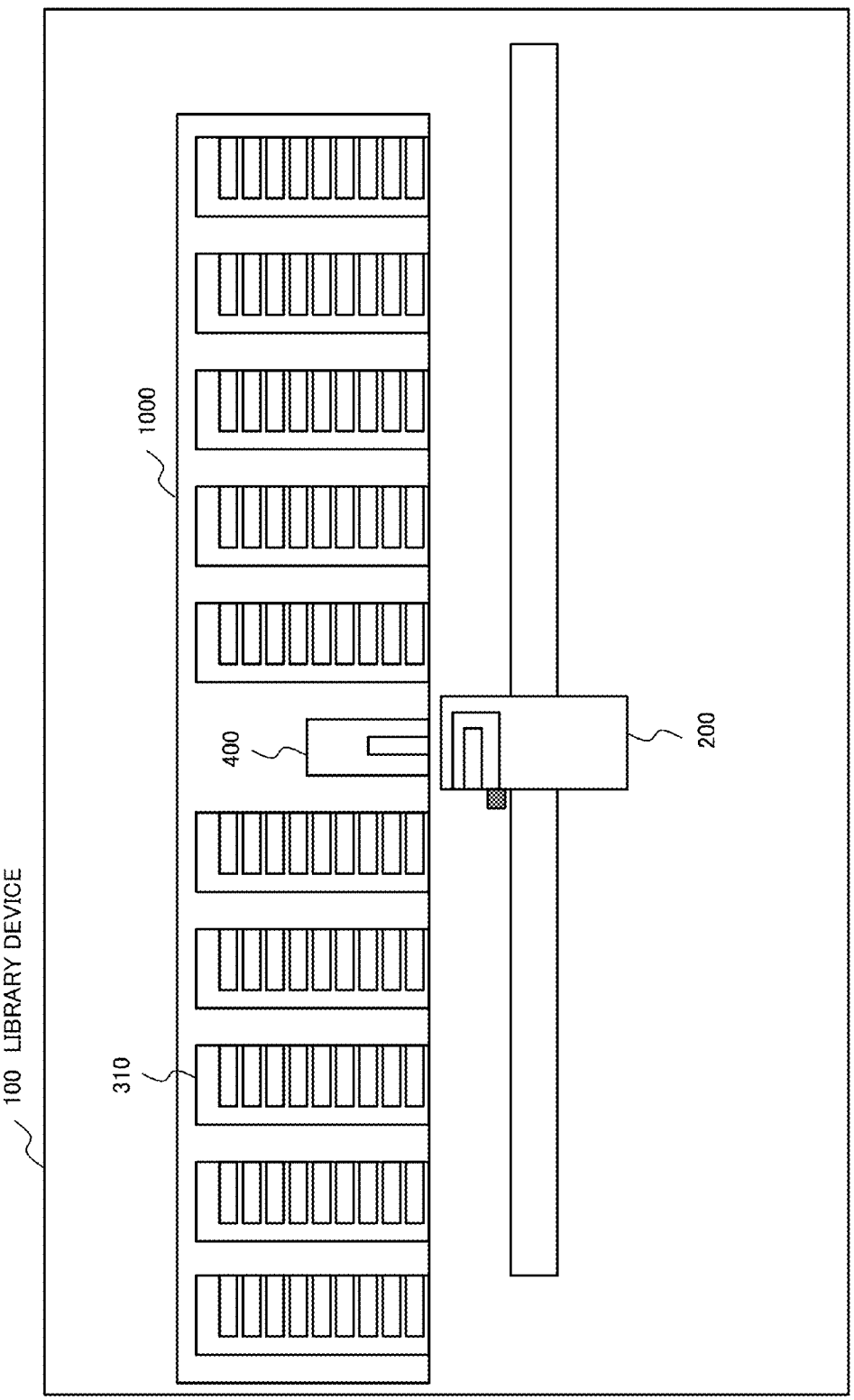
FIG. 1 is a schematic diagram (a top view) illustrating an example of a library device 100 according to a first exemplary embodiment of the present invention.

FIG. 1 is a schematic diagram (a top view) illustrating an example of a library device 100 according to a first exemplary embodiment of the present invention. The library device 100 includes a robot 200, cell units 310 placed in a rack 1000, and drives 400 installed in the rack 1000.

Figure 2:
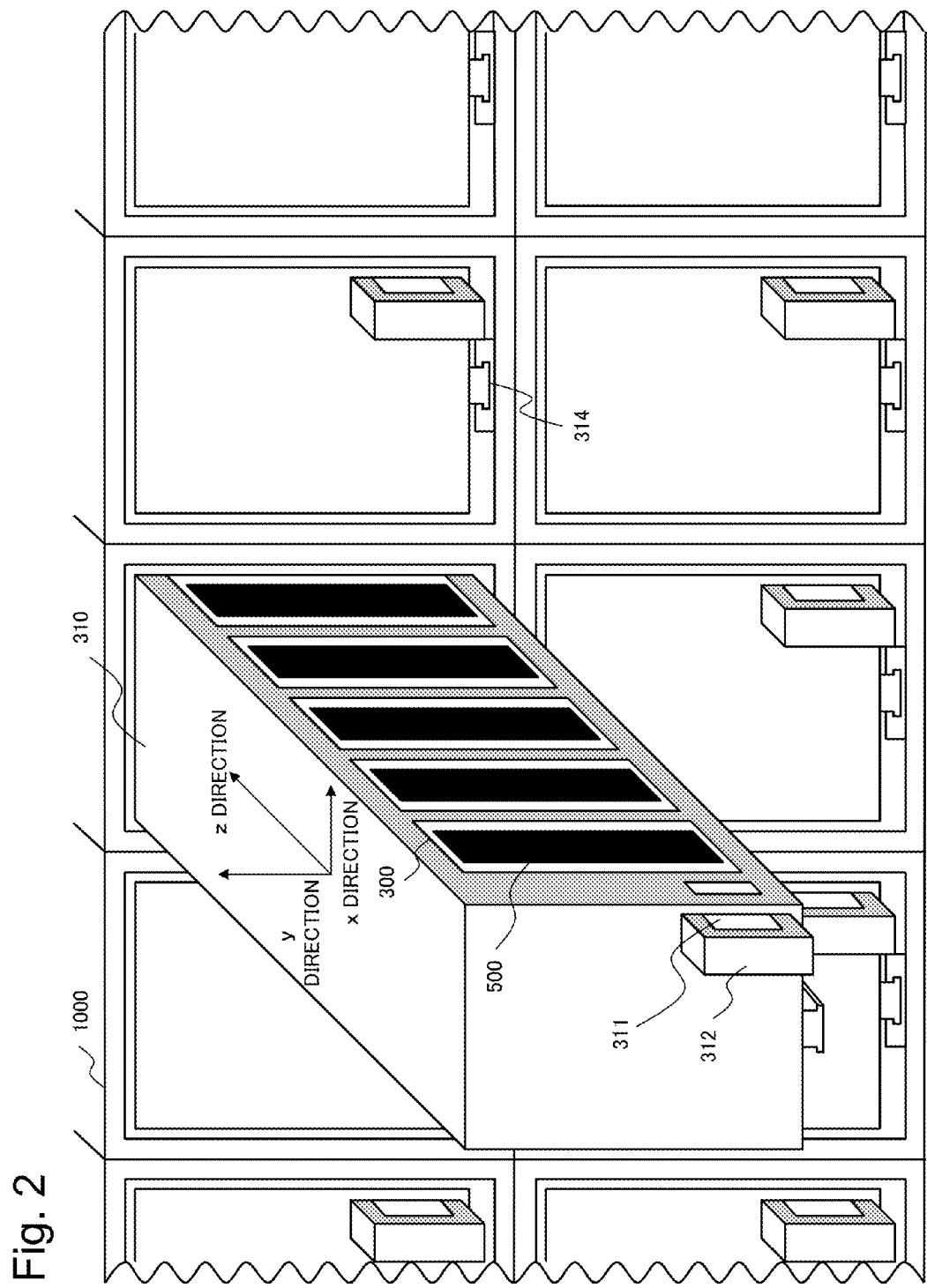
FIG. 2 is a schematic diagram illustrating an example of a state in which a cell unit 310 is pulled out of a rack 1000 of the library device 100 according to the first exemplary embodiment of the present invention.

FIG. 2 is a schematic diagram illustrating an example of a state in which one cell unit 310 is pulled out of the rack 1000 of the library device 100 according to the first exemplary embodiment of the present invention. Here, width direction of the rack 1000, i.e. the direction along which the cell units 310 are arranged, is defined as the x-axis direction (hereinafter simply referred to as the x direction). Similarly, the height direction in which the cell units 310 are stacked is defined as the y-axis direction (hereinafter simply referred to as the y direction). Further, the direction orthogonal to the x direction and y direction and along which a cell unit 310 moves with respect to the rack is defined as the z-axis direction (hereinafter simply referred to as the z direction).

The rack 1000 holds a plurality of cell units 310. As illustrated in FIG. 2, the cell units 310 are stored in two stages in the y direction. Note that the number of stages in the y direction in the present invention is not limited to two. A plurality of drives 400 illustrated in FIG. 1 are arranged along the direction of the height of the rack 1000 at the center of width direction (the x direction) of the rack 1000. Each of the drives 400 is loaded with a cartridge 500 unloaded from a cell unit by the robot 200 and reads information written on a storage medium in the cartridge 500. Alternatively, the drive 400 may write information on the recording medium in the cartridge 500.

Each of the cell units 310 has a plurality of cells 300 for holding cartridges 500 at one side. Each cell has an opening. The cells and cartridges are arranged along the z direction. One cartridge 500 is loaded into a cell 300 in the x direction through the opening. Each cell unit 310 is loaded into the rack 1000 of the library device in the z direction, which is the depth of the rack 1000.

The bottom of the cell unit 310 is attached to the rack 1000 with a cell unit slide rail 314 so that the cell unit 310 smoothly slides along the z direction. For the smooth sliding, the cell unit 310 may be equipped with auxiliary parts such as rollers or ball bearings in the cell unit slide rail 314. A cell unit hook 312 is provided at the front of the cell unit 310. A recess is provided in the x direction in the cell unit hook 312 and a cell unit lock 311 is provided inside the recess. The surface in which the recess of the cell unit hook 312 is provided is at the same side as the surface of the openings in the cells 300.

Figure 3:
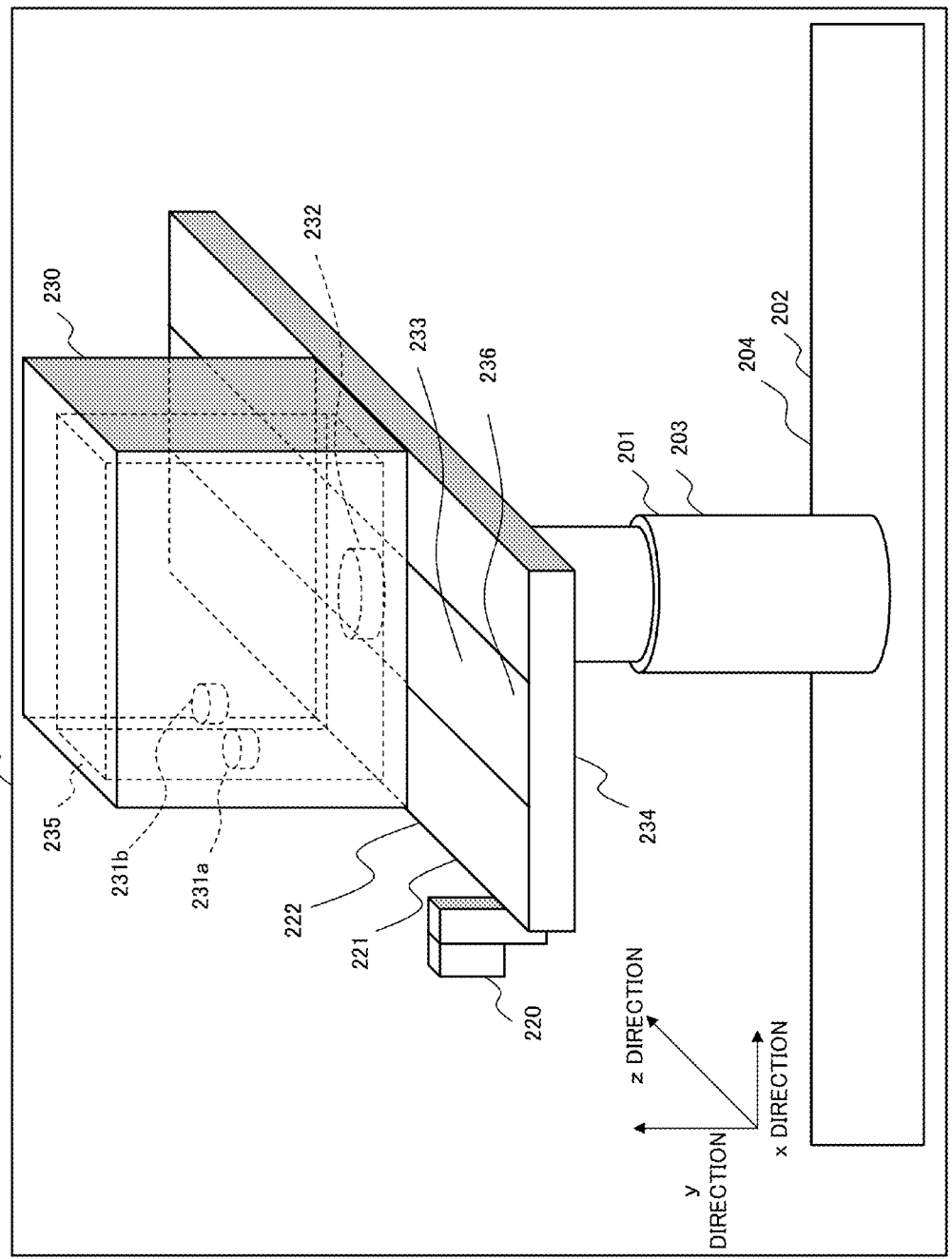
FIG. 3 is a perspective view illustrating an example of a robot 200 of the library device 100 according to the first exemplary embodiment of the present invention.
Figure 4:
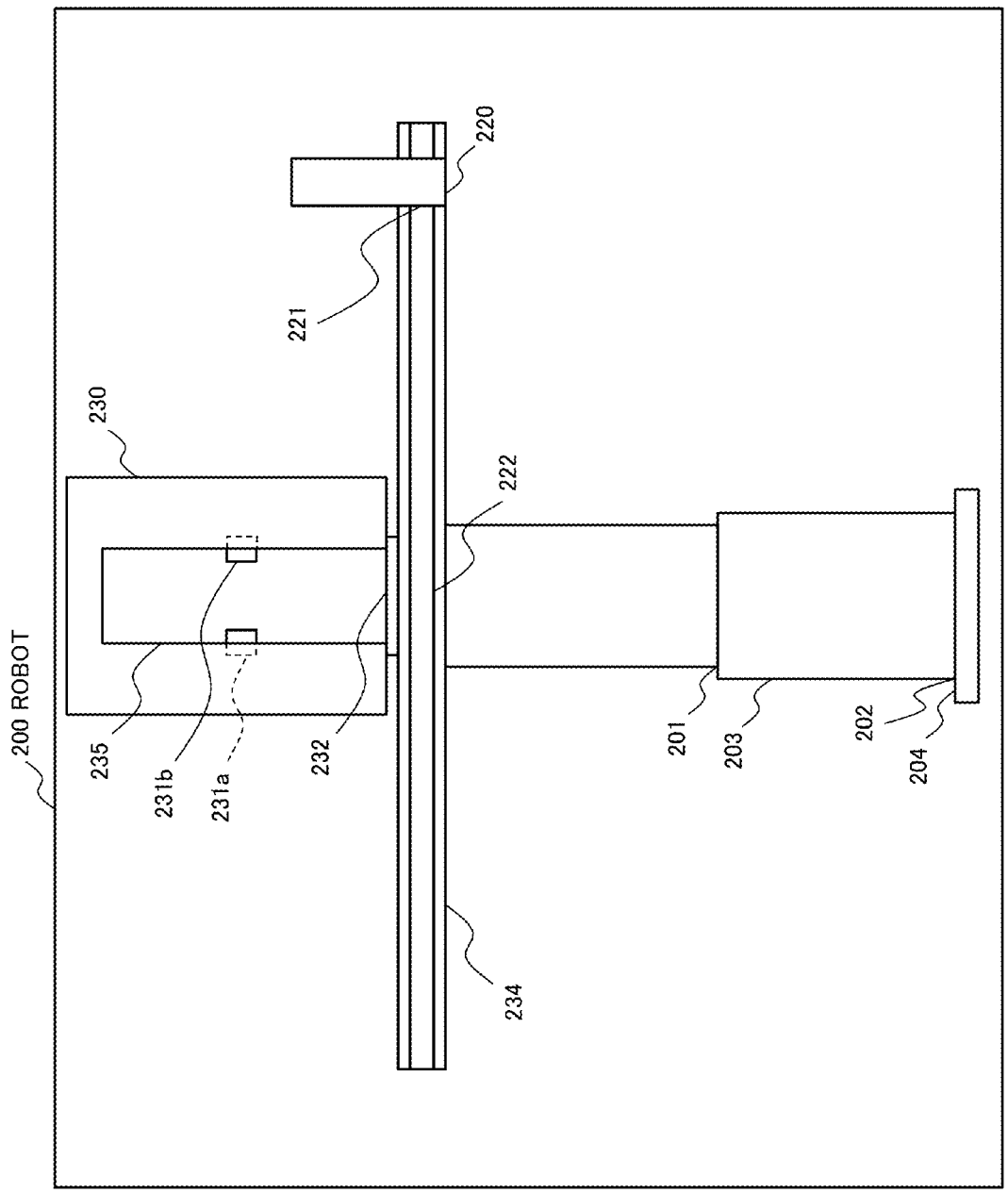
FIG. 4 is a front view illustrating an example of the robot 200 illustrated in FIG. 3.

FIG. 3 is a perspective view illustrating an example of the robot 200 of the library device 100 according to the first exemplary embodiment of the present invention and FIG. 4 is a front view of the example of the robot 200.

A robot slide rail 204 for sliding in the x direction is provided on the floor of the library device 100 and a height-adjustable robot leg 203 is provided on the robot slide rail 204. The robot slide rail 204 and the height-adjustable robot leg 203 constitute a first mechanism that moves the robot 200 at least along the width direction of the rack 1000.

A second mechanism and a third mechanism of the robot 200 are configured as described below. The second mechanism pulls out or loads the cell unit 310 from or into the rack 1000. The third mechanism pulls out or loads a cartridge 500 from or into a cell 300 in the state where the cell unit 310 is pulled out, and loads or unloads a cartridge 500 into or from a drive 400 that operates the cartridge 500.

As illustrated in FIG. 4, the second mechanism includes a cell unit picker 220 and a cell unit picker slide rail 222 for sliding the cell unit picker 220 along the z direction. The cell unit picker slide rail 222 is provided on a side surface of the cartridge picker stage 234. The cell unit picker 220 is provided on the cell unit picker slide rail 222. The cell unit picker 220 of the second mechanism is pushed into the cell unit hook 312 of the cell unit 310 to unlock the cell unit lock 311. Thus, the cell unit picker 220 functions as device for releasing the locking of the cell unit lock 311. The cell unit picker 220 is a hook-like member for pulling out or loading the cell unit 310. The cell unit picker 220 includes a built-in cell unit picker driving unit 221 and is movable along the cell unit picker slide rail 222 under its own power.

In the third mechanism, the cartridge picker stage 234 is provided on the top surface of the robot leg 203 and a cartridge picker slide rail 236 for sliding the cartridge picker 230 along the z direction is provided on the top surface of the cartridge picker stage 234. The cartridge picker 230 is provided on the cartridge picker slide rail 236 with a cartridge picker rotation driving unit 232 therebetween.

Like the cell unit slide rail 314, the robot slide rail 204 of the first mechanism may be equipped with auxiliary parts such as rollers or ball bearings inside the robot slide rail 204 for smooth sliding. Similarly, the cartridge picker slide rail 236 of the third mechanism and the cell unit picker slide rail 222 of the second mechanism may be equipped with auxiliary parts inside them for smooth sliding. The height of the robot leg 203 is adjustable at least between a height at which a cartridge 500 can be loaded into or unloaded from the cell unit 310 or a drive 400 at the top level of the library device 100 and a height at which a cartridge 500 can be loaded into or unloaded from the cell unit 310 or a drive 400 at the bottom level. The height may be adjusted by any method.

The cartridge picker 230 loads a cartridge 500 therein through the cartridge picker opening 235. For loading or unloading the cartridge 500, cartridge carriers 231a and 231b are respectively provided on both inner side surfaces of the cartridge picker 230. The cartridge carriers 231a and 231b are rollers having a rotation axis along the y direction. The distance between the cartridge carriers 231a and 231b is approximately equal to the width of the cartridge 500. The cartridge carriers 231a and 231b may be made of any material that does not hinder the transfer of the cartridge 500. If an elastic material such as rubber or silicone is chosen, the distance between the cartridge carriers 231a and 231b may be shorter than the width of the cartridge 500. This generates friction in the cartridge carriers 231a and 231b for transferring the cartridge 500. While the cartridge carriers 231a and 231b are depicted as a pair of rollers in FIG. 3, a plurality of cartridge carriers may be provided on each of both sides of the cartridge picker opening 235 as long as they do not hinder the transfer of the cartridge 500.

The robot slide rail 204, the robot leg 203, and the cartridge picker slide rail 236 are provided in order to respectively move the cartridge picker 230 in the x direction, y direction, and z direction to adjust the position of the cartridge picker 230. The robot slide rail 204, the robot leg 203, and the cartridge picker slide rail 236 are equipped with a robot slide driving unit 202, a robot height adjustment unit 201, and a cartridge picker slide driving unit 233, respectively.

Figure 5:
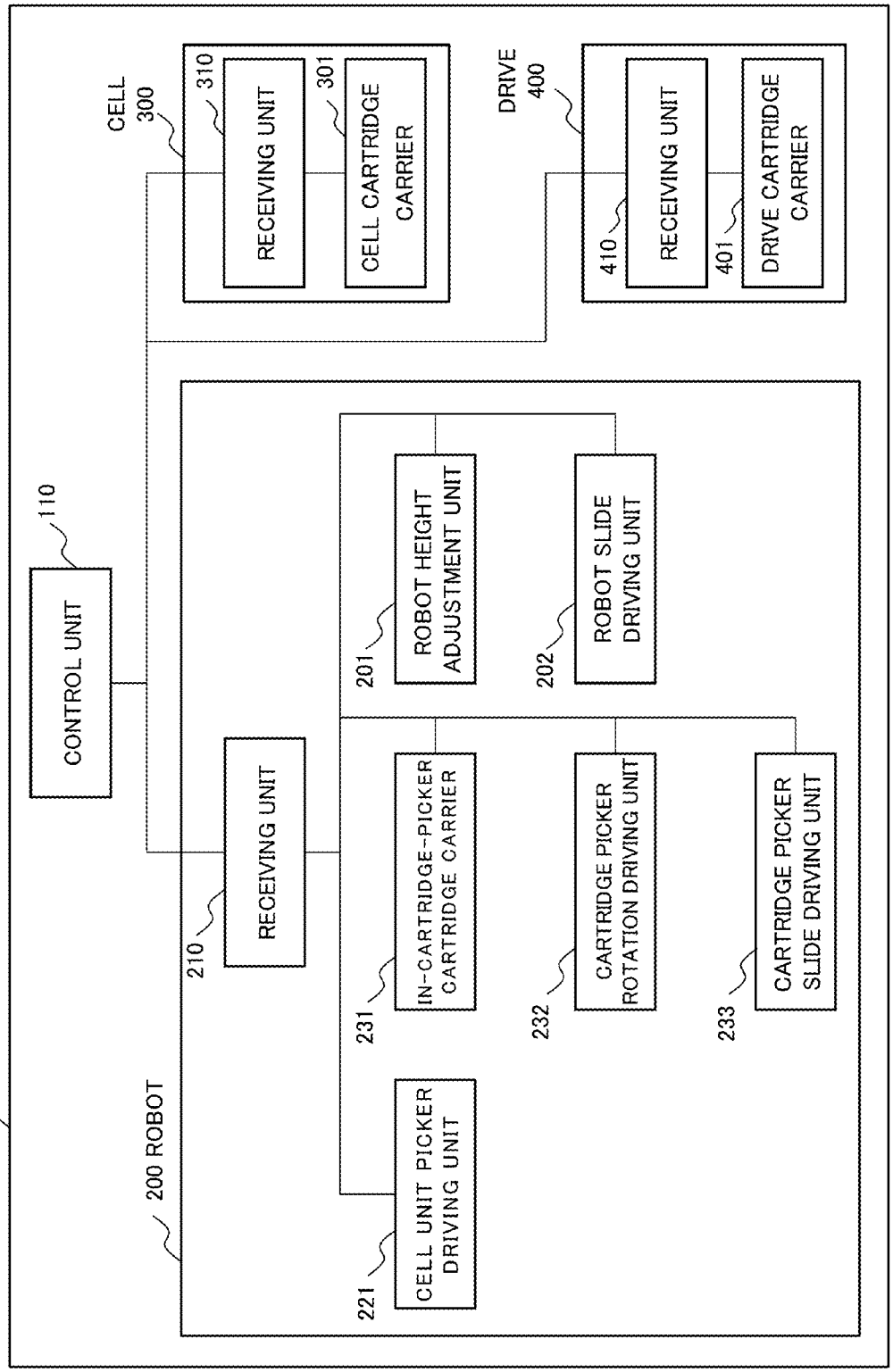
FIG. 5 is a block diagram illustrating a circuit configuration of drive units and a control unit for driving and controlling the first exemplary embodiment of the present invention.

FIG. 5 is a block diagram illustrating a circuit configuration of driving units and a control unit for driving and controlling the library device 100 according to the first exemplary embodiment of the present invention. Referring to FIG. 5, the library device 100 includes a control unit 110, a robot 200, a cell 300, and a drive 400. The control unit 110 determines operations of the robot 200, the cell 300, and the drive 400 according to instructions input through an input device, not depicted, and sends control signals to receiving units of these components. The robot 200 includes a receiving unit 210, the robot height adjustment unit 201, the robot slide driving unit 202, the cell unit picker driving unit 221, cartridge carriers 231, a cartridge picker rotation driving unit 232, and the cartridge picker slide driving unit 233.

The control unit 110 of the library device 100 depicted in FIG. 5 controls these units so that the cartridge picker 230 can freely move in the x, y and z directions. The control unit 110 of the library device 100 depicted in FIG. 5 controls the cell unit picker driving unit 221 so that the cell unit picker 220 can freely move along the cell unit picker slide rail 222 in the z direction. Further, the control unit 110 of the library device 100 depicted in FIG. 5 controls the cartridge picker rotation drive unit 232 so that the cartridge picker 230 can freely rotate around an axis along the y direction.

When the cartridge 500 is not transferred, the cartridge picker 230 and the cell unit picker 220 stay in predetermined positions where they do not caught by the cell unit hook 312 of the cell unit 310 that is not involved in the manipulation of the robot 200. The control unit 110 controls the robot height adjustment unit 201 to adjust the cartridge picker stage 234 to a predetermined height at which an end of the cartridge picker stage 234 in the z direction (an end closer to the rack) is not caught by the cell unit hook 312 of the cell unit 310. The cartridge picker stage 234 may be located in any position in the x direction.

Further in FIG. 5, the cell 300 includes a receiving unit 310 and cell cartridge carriers 301.

The drive 400 includes a receiving unit 410 and drive cartridge carriers 401.

The receiving units 210, 310, and 410 receive control signals from the control unit 110 and send the control signals to relevant facilities of the robot, the cell, and the drive, respectively. Communications with the control unit 110 may be wired or wireless.

The cell cartridge carriers 301 and the drive cartridge carriers 401 are provided to load or unload a cartridge 500 between the cell 300 and the drive 400, respectively, and the cartridge picker 230. The cell cartridge carriers 301 and the drive cartridge carriers 401 are rollers, like the cartridge carriers 231 (231a, 231b), which rotate around an axis along the y direction, and are provided on both inner side surfaces of the cell 300 and the drive 400, respectively. The distance between the cell cartridge carriers 301 disposed on both inner side surfaces of the cell 300 is approximately equal to the width of a cartridge 500, like the distance between the cartridge carriers 231a and 231b. Alternatively, the distance may be shorter than the width of the cartridge 500, depending on the material. The same applies to the distance between the drive cartridge carriers 401 disposed on both inner side surfaces of the drive 400. The cell cartridge carriers 301 and the drive cartridge carriers 401 may be made of any material that does not hinder the transfer of the cartridge 500. A plurality of cell cartridge carriers 301 and drive cartridge carriers 401 may be provided on each of both side surfaces.

Figure 6:
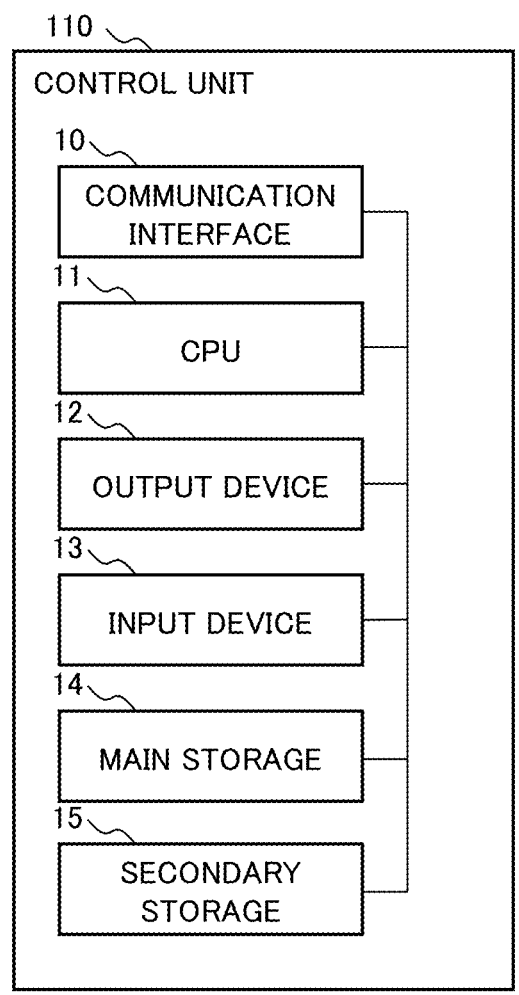
FIG. 6 is a diagram illustrating a hardware configuration of the control unit 110 implemented by a computer device according to the first exemplary embodiment.

FIG. 6 is a diagram illustrating a hardware configuration of a computer device implementing the control unit 110 according to the first exemplary embodiment of the present invention. As illustrated in FIG. 6, the control unit 110 includes a communication interface 10, a CPU 11, an output device 12, an input device 13, a main storage 14, and a secondary storage 15. The control unit 110 is configured to be able to perform control according to a computer program.

The communication interface 10 constitutes an input/output interface for communicating with a peripheral terminal. The communication interface 10 includes an interface for controlling connection to a network, not depicted, that is connected with the control unit 110.

The CPU 11 runs an operating system to control the entire control unit 110 according to the first exemplary embodiment of the present invention. The CPU 11 retrieves a computer program or data from the secondary storage 15, for example, onto the main storage 14. The control unit 110 is not limited to a single CPU 11, and may include two or more CPUs 11.

The output device 12 may be implemented by a display or an indicator, for example, and is used for checking outputs.

The input device 13 may be implemented by a mouse, a keyboard, built-in key buttons, or the like and is used for input operations. The input device 13 is not limited to a mouse, a keyboard, and built-in key buttons; the input device may be a touch panel, for example.

The main storage 14 is a working memory under the control of the CPU 11.

The secondary storage 15 may be an optical disc, a flexible disk, a magneto-optical disc, an external hard disk, a semiconductor memory, or the like and stores a computer program in a computer-readable manner. The secondary storage 15 stores a computer program to be executed by the control unit 110 in a transitory or non-transitory manner. The computer program may be downloaded from an external computer, not depicted, connected to a communication network.

An operation of the library device 100 thus configured will be described with reference to FIGS. 5 to 35.

FIGS. 7 to 14 are schematic diagrams schematically illustrating an operation when a cartridge 500 is transferred from a cell 300 to the cartridge picker 230 in the library device 100 according to the first exemplary embodiment. Note that the process according to the flowchart may be executed on the basis of program control by the CPU 11 described above.

Figure 7:
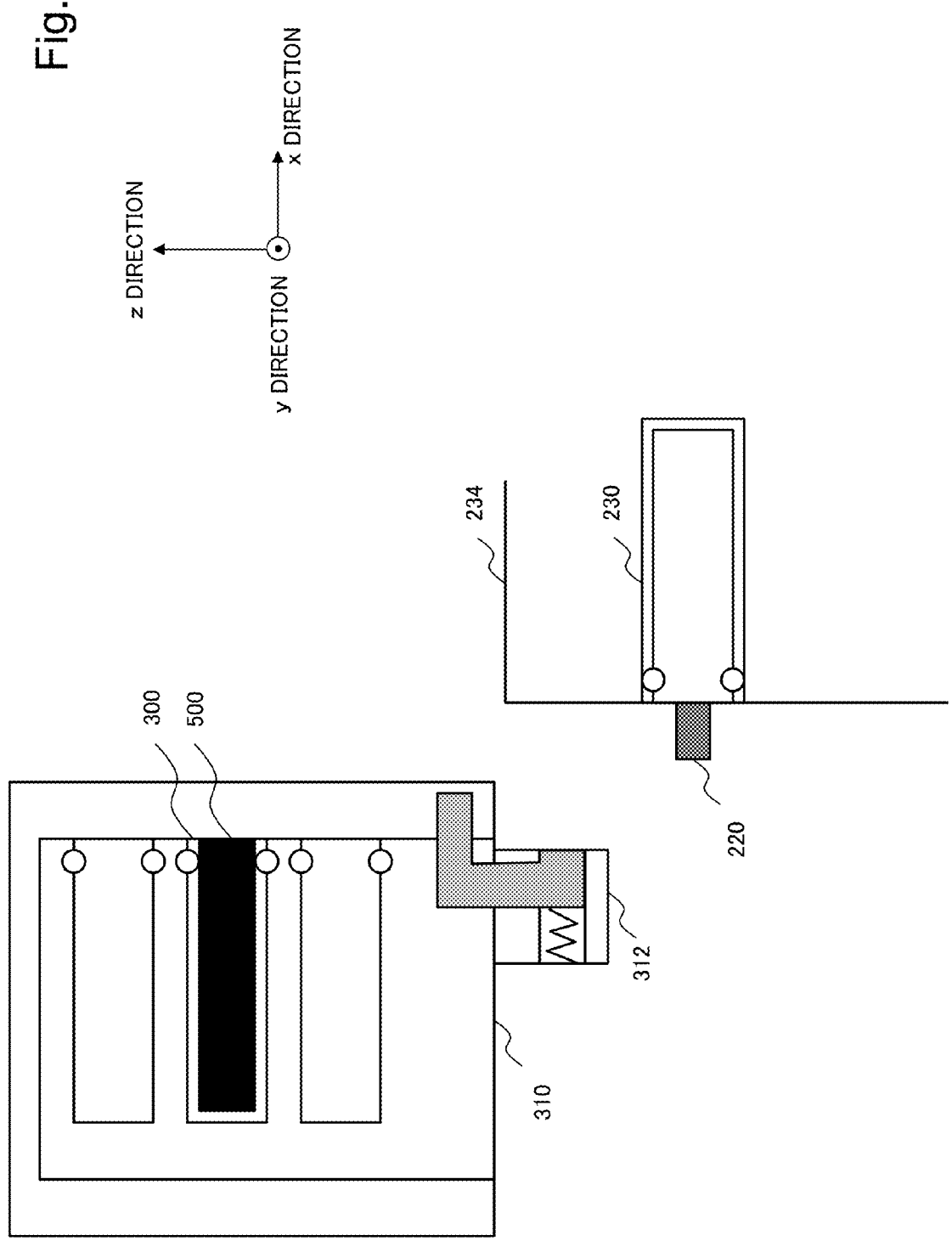
FIG. 7 is a schematic diagram schematically illustrating an operation before a cartridge 500 is transferred from a cell 300 to a cartridge picker 230 in the library device 100 according to the first exemplary embodiment.

First, when the robot 200 is not in operation, the cartridge picker stage 234 is fixed at a predetermine height at which the end of the cartridge picker stage 234 in the z direction (the end closer to the rack) is not caught by the cell unit hook 312 of a cell unit 310. As illustrated in FIG. 7, the cartridge picker 230 and the cell unit picker 220 are fixed at a predetermined initial position where they are not caught by the cell unit hook 312 of the cell unit 310. The cartridge picker stage 234 may be in any initial position in the x direction. Note that FIG. 7 is a partial plan view of the library device viewed from the same direction as in FIG. 1. The same applies to FIGS. 8 to 26. For clarity of the operation, part of internal portions of the cell unit 310, the cartridge picker 230, and the drive 400 are made visible in the drawings. Only one cell unit 310 and a configuration of the rack 1000 only around the cell unit 310 are depicted in FIGS. 7 to 26; overall configuration of the rack 1000 is omitted from the drawings.

As illustrated in FIG. 5, the control unit 110 first controls the robot slide driving unit 202 to adjust the position of the cartridge picker stage 234 in the x direction (the direction indicated by an arrow in FIG. 8) with respect to the position of the cell unit 310 holding a target cartridge 500 (the cartridge chosen by the control unit 110 as a cartridge to be loaded into the drive 400).

Figure 8:
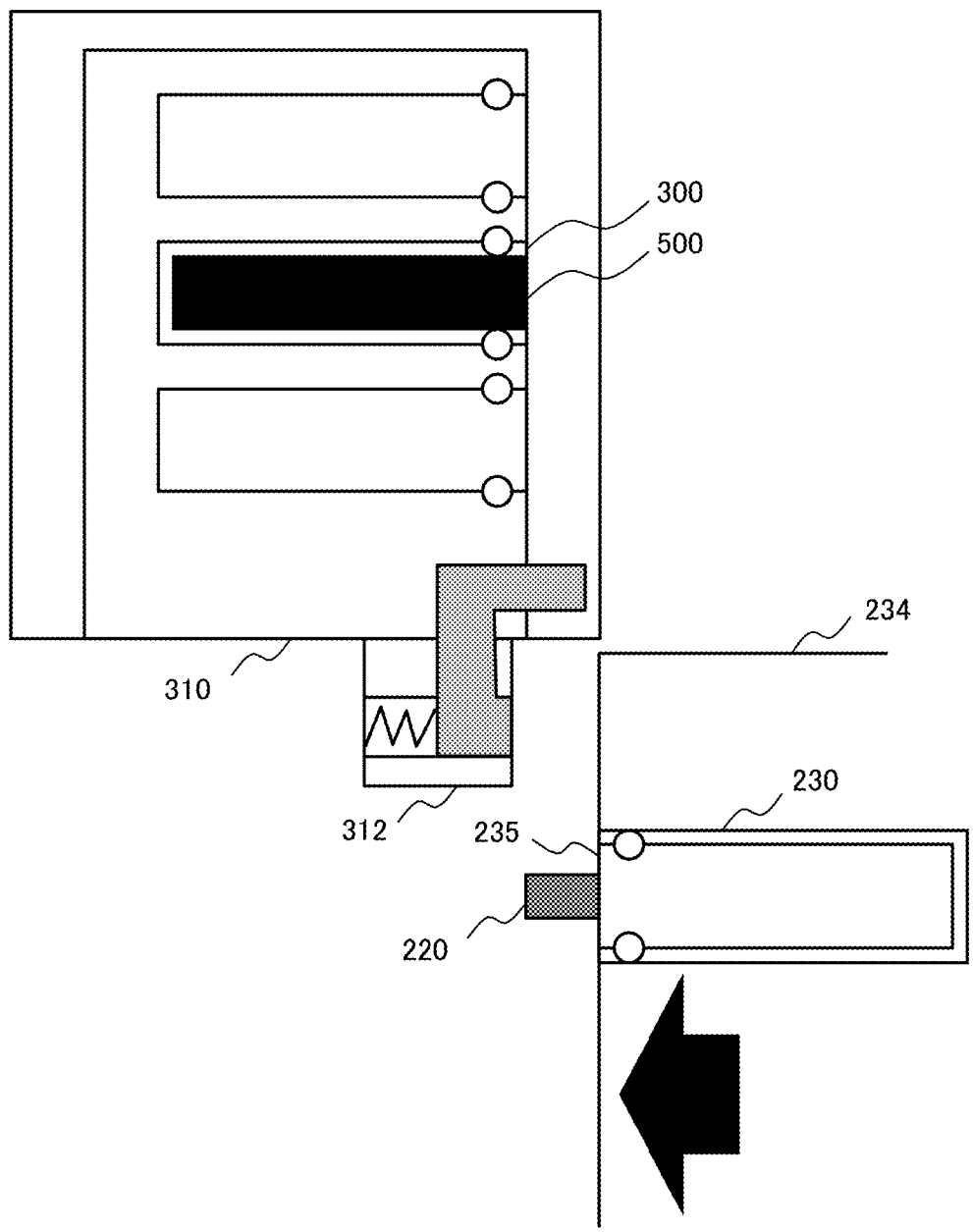
FIG. 8 is a schematic diagram schematically illustrating an operation of adjusting the position of the cartridge picker stage 234 in an x direction before the cartridge 500 is transferred from the cell 300 to the cartridge picker 230 in the library device 100 according to the first exemplary embodiment.

Here, as illustrated in FIG. 8, the distance between the cell unit hook 312 and the cartridge picker stage 234 in the x direction is at least approximately equal to the length of the cell unit picker 220 in the x direction and does not hinder the movement of the cell unit picker 220 in the z direction.

The control unit 110 then controls the robot height adjustment unit 201 to adjust the level of the cartridge picker 230 so that the cartridge picker opening 235 levels with the cell 300 that holds the target cartridge 500.

Figure 9:
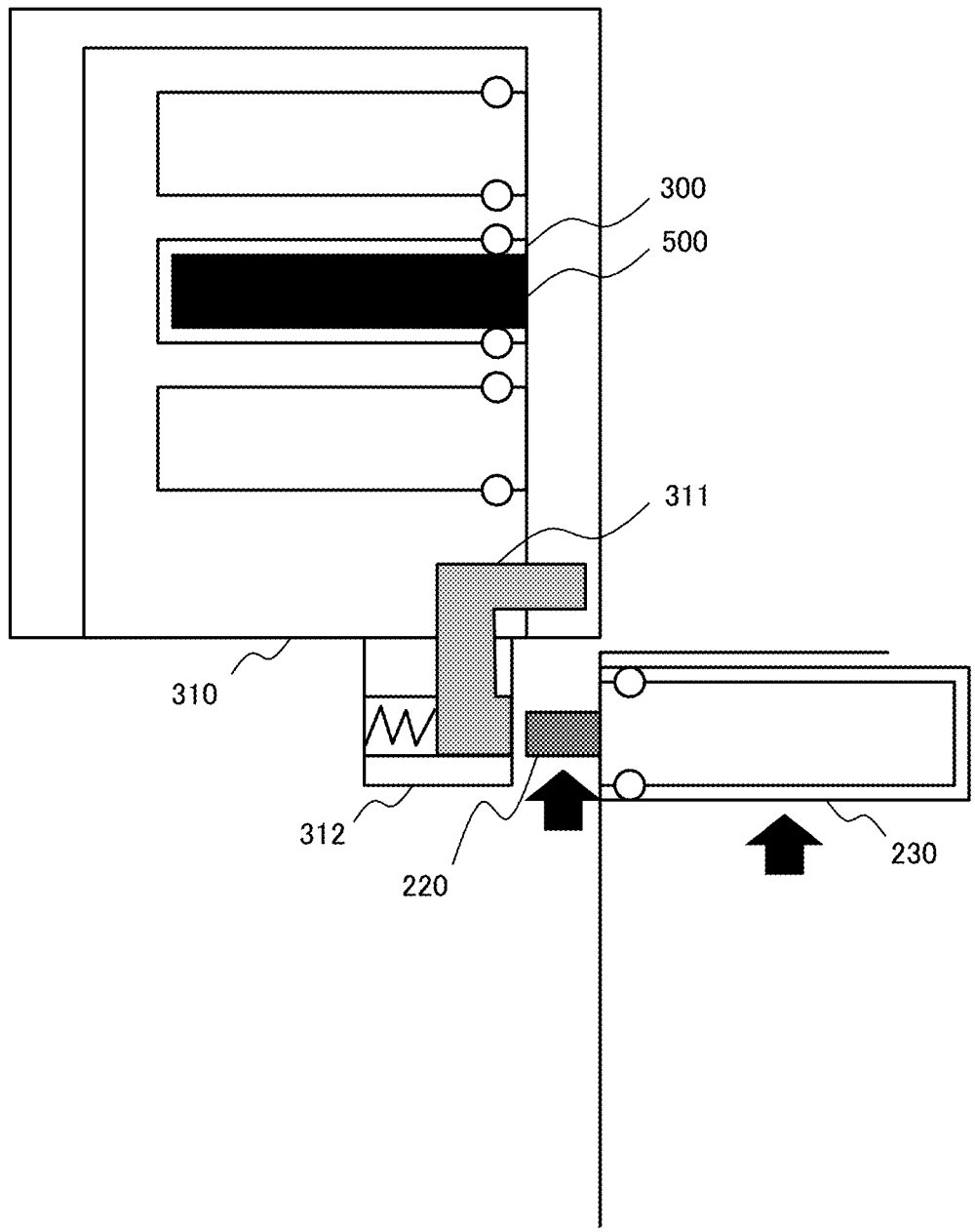
FIG. 9 is a schematic diagram schematically illustrating an operation of adjusting the position of the cartridge picker 230 and a cell unit picker 220 in a z direction before the cartridge 500 is transferred from the cell 300 to the cartridge picker 230 in the library device 100 according to the first exemplary embodiment.

The control unit 110 then controls the cartridge picker slide driving unit 233 and the cell unit picker driving unit 221 (FIG. 5) to adjust the position of the cartridge picker 230 and the cell unit picker 220 in the z direction. During the adjustment, the cartridge picker 230 moves toward the cell unit 310 holding the target cartridge 500, i.e. toward an end of the cartridge picker slide rail 236 (FIG. 3) as illustrated in FIG. 9. As a result, the cell unit picker 220 moves to the position where the cell unit picker 220 can engage with the cell unit hook 312.

Figure 10:
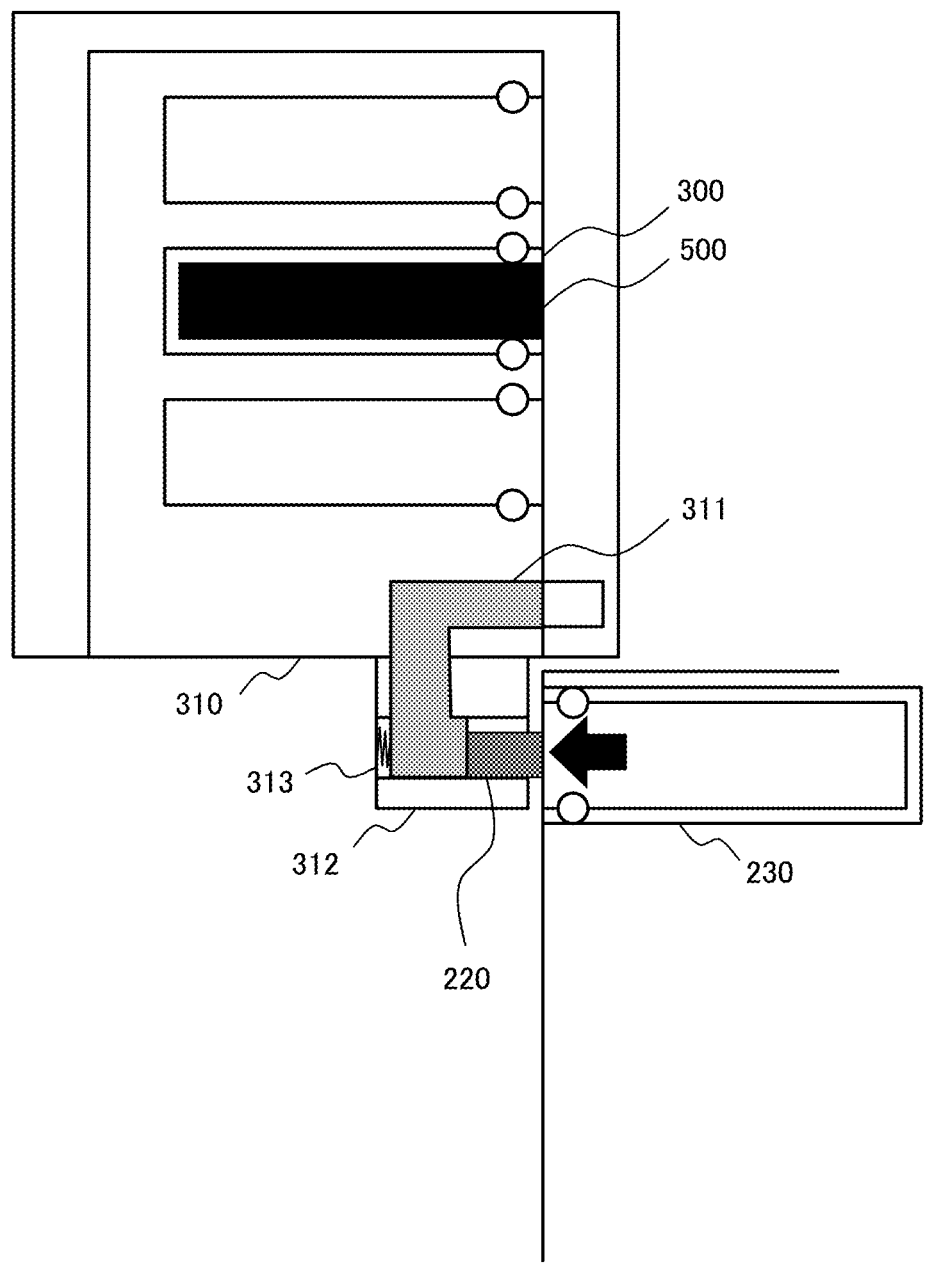
FIG. 10 is a schematic diagram schematically illustrating an operation of adjusting the x-direction position in the direction in which the cell unit picker 220 is pushed into a cell unit hook 312 before the cartridge 500 is transferred from the cell 300 to the cartridge picker 500 in the library device 100 according to the first exemplary embodiment.

As illustrated in FIGS. 5 and 10, the control unit 110 then controls the robot slide driving unit 202 (FIG. 5) to adjust the x-direction position of the cell unit picker 220 to the direction in which the cell unit picker 220 is pushed into the cell unit hook 312. A substantially L-shaped cell unit lock 311 and a cell unit lock spring 313 which pushes out the cell unit lock 311 toward the cell unit picker 220 are built in a recess of the cell unit hook 312.

When the cell unit 310 is locked, one end of the cell unit lock 311 is inserted in a niche in the inner wall of the rack 1000 from the front of the cell unit 310 and the other end is pushed out toward the cell unit picker 220 (FIGS. 7 to 9). This ensures that the cell unit 310 is loaded in the rack 1000 such that the cell unit 310 is hardly pulled out unintentionally. As illustrated in FIG. 10, when the cell unit picker 220 is pushed into the cell unit hook 312, the cell unit lock 311 is pushed against the tension of the cell unit lock spring 313 and one end of the cell unit lock 311 is discharged from the inner wall of the rack 1000. This unlocks the cell unit 310 to allow the cell unit 310 to be pulled out.

Figure 11:
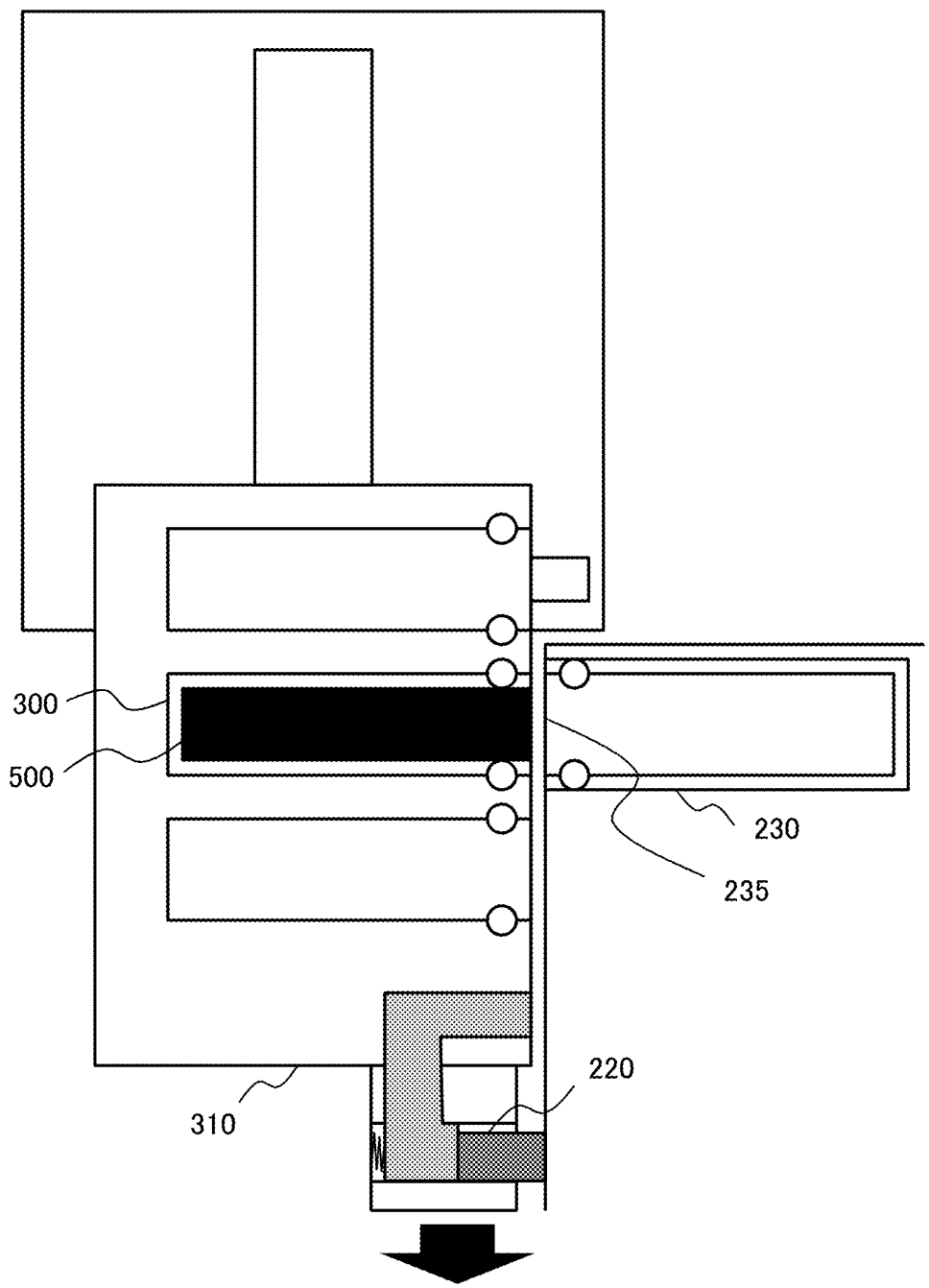
FIG. 11 is a schematic diagram schematically illustrating an operation of moving the cell unit picker 220 in the z direction in which the cell unit 310 is pulled out before the cartridge 500 is transferred from the cell 300 to the cartridge picker 230 in the library device 100 according to the first exemplary embodiment.

As illustrated in FIGS. 5 and 11, the control unit 110 then controls the cell unit picker driving unit 221 to move the cell unit picker 220 along the cell unit picker slide rail 222 (FIG. 4) in the z direction in which the cell unit 310 is pulled out. After the cell unit 310 has been pulled out until a position of the cell 300 holding the target cartridge 500 coincides with a position of the cartridge picker opening 235, the control unit 110 controls the cell unit picker driving unit 221 to stop the cell unit picker 220.

Figure 12:
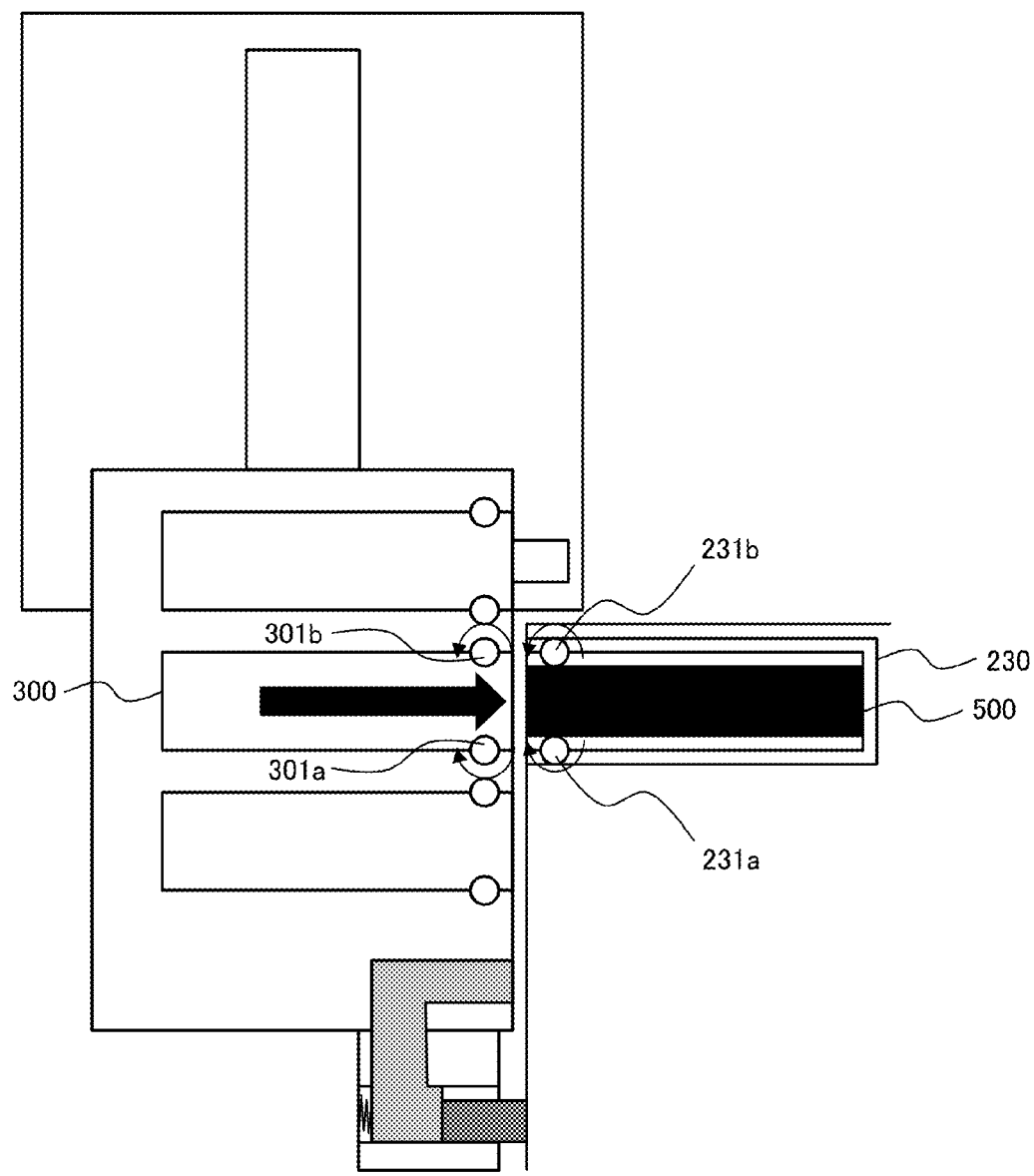
FIG. 12 is a schematic diagram schematically illustrating an operation of transferring the cartridge 500 from the cell 300 to the cartridge picker 230 in the library device 100 according to the first exemplary embodiment.

As illustrated in FIGS. 5 and 12, the control unit 110 then performs control to unload the cartridge 500 from the cell 300 and to load the cartridge 500 into the cartridge picker 230. Specifically, the control unit 110 controls the rotations of the cell cartridge carriers 301a and 301b (the cell cartridge carriers 301 in FIG. 5), the cartridge carriers 231a and 231b (the cartridge carriers 231 in FIG. 5).

Figure 13:
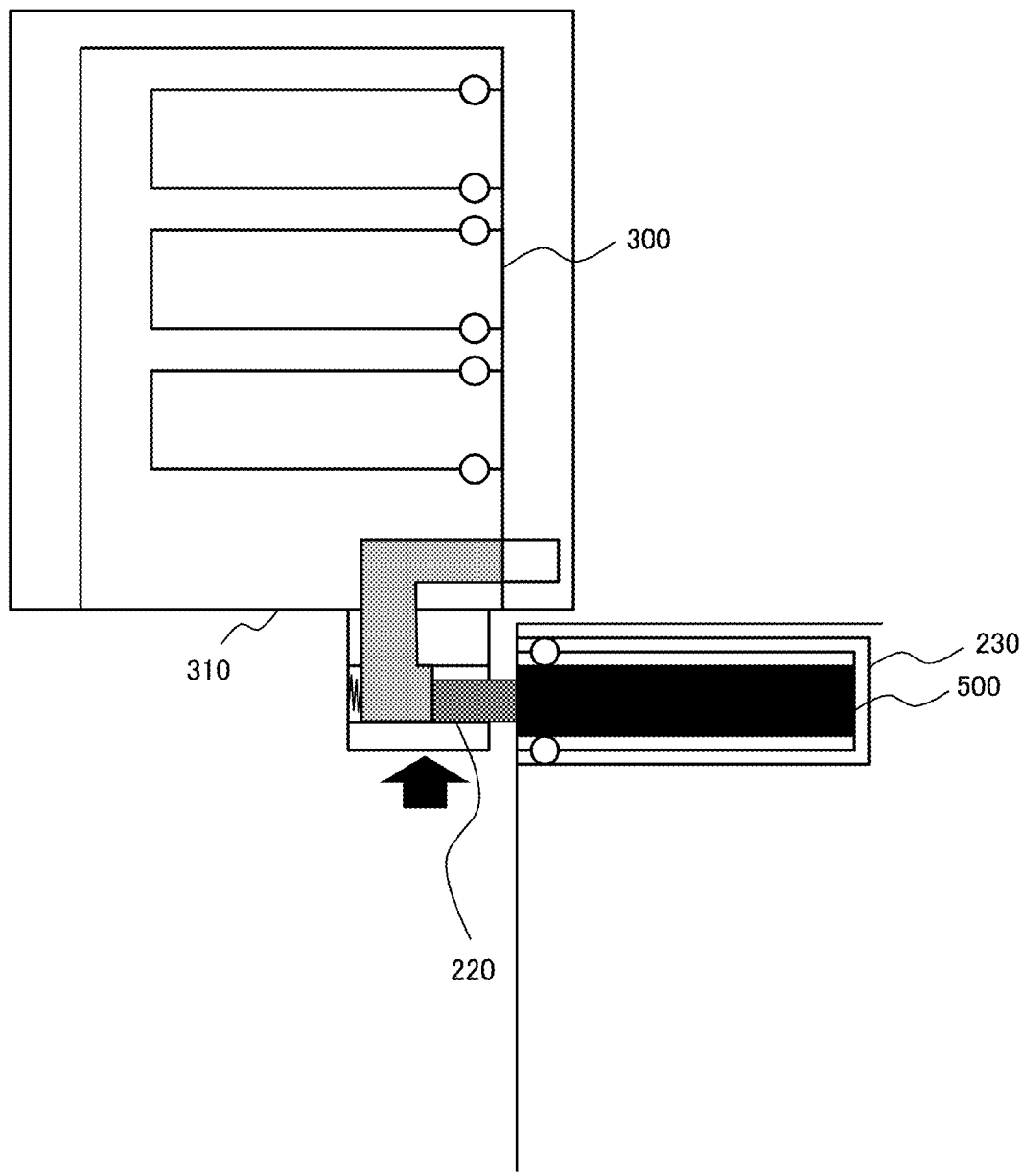
FIG. 13 is a schematic diagram schematically illustrating an operation of moving the cell unit picker 220 in the z direction in which the cell unit 310 is loaded after the cartridge 500 is transferred from the cell 300 to the cartridge picker 230 in the library device 100 according to the first exemplary embodiment.

As illustrated in FIGS. 5 and 13, the control unit 110 then controls the cell unit picker driving unit 221 to move the cell unit picker 220 in the z direction in which the cell unit 310 is loaded into the rack 1000.

Figure 14:
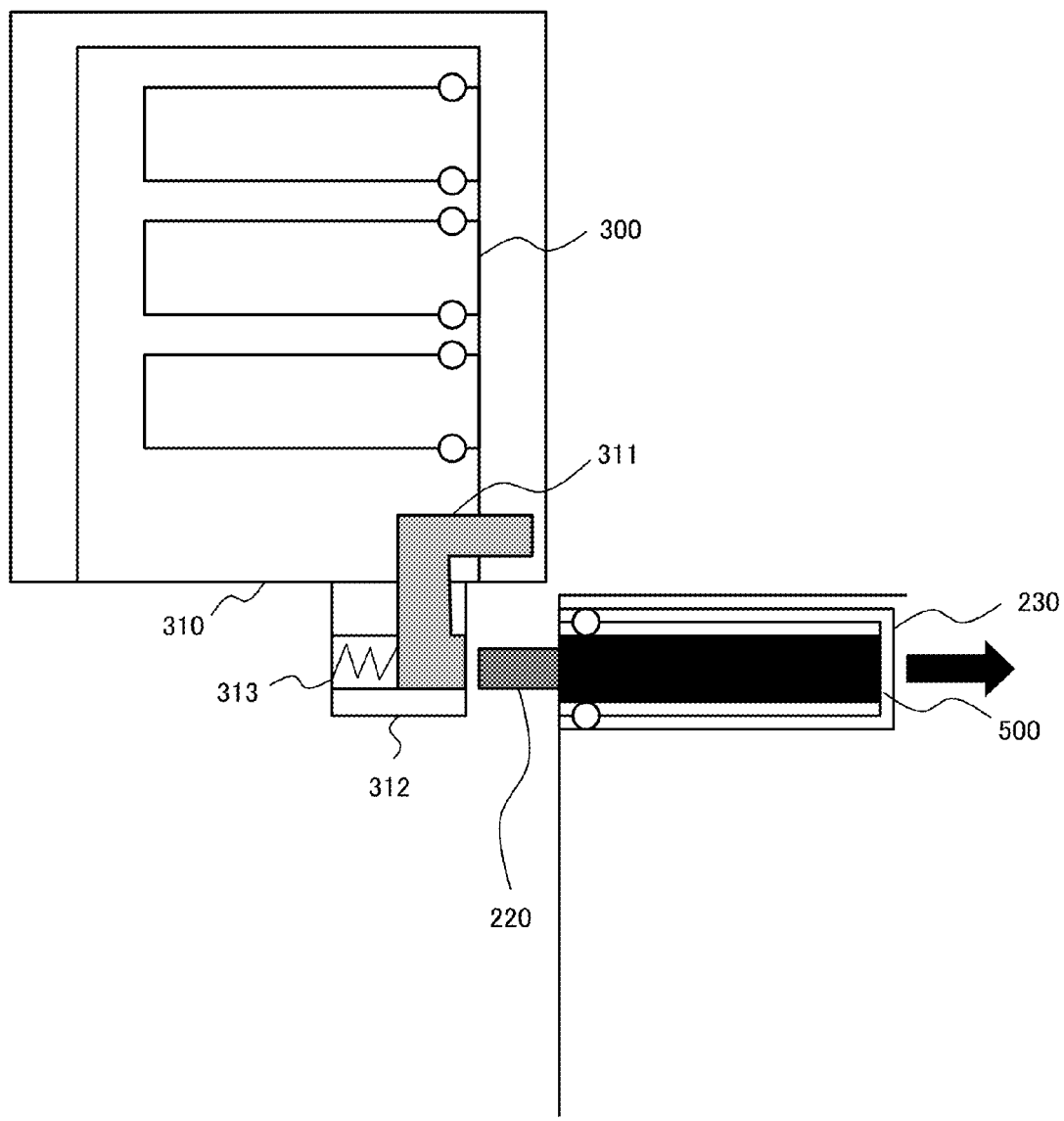
FIG. 14 is a schematic diagram schematically illustrating an operation of adjusting the x-direction position in the direction in which the cell unit picker 220 is pulled out of the cell unit hook 312 after the cartridge 500 is transferred from the cell 300 to the cartridge picker 230 in the library device 100 according to the first exemplary embodiment.

As illustrated in FIGS. 5 and 14, the control unit 110 then controls the robot slide driving unit 202 to adjust the position of the cell unit picker 220 in the x direction in which the cell unit picker 220 is pulled out of the cell unit hook 312. With this operation, one end of the cell unit lock 311 is inserted into the inner wall of the rack by the tension of the cell unit lock spring 313. As a result, the cell unit 310 is locked and the cell unit 310 is loaded into the rack such that the cell unit 310 is hardly pulled out.

Figure 15:
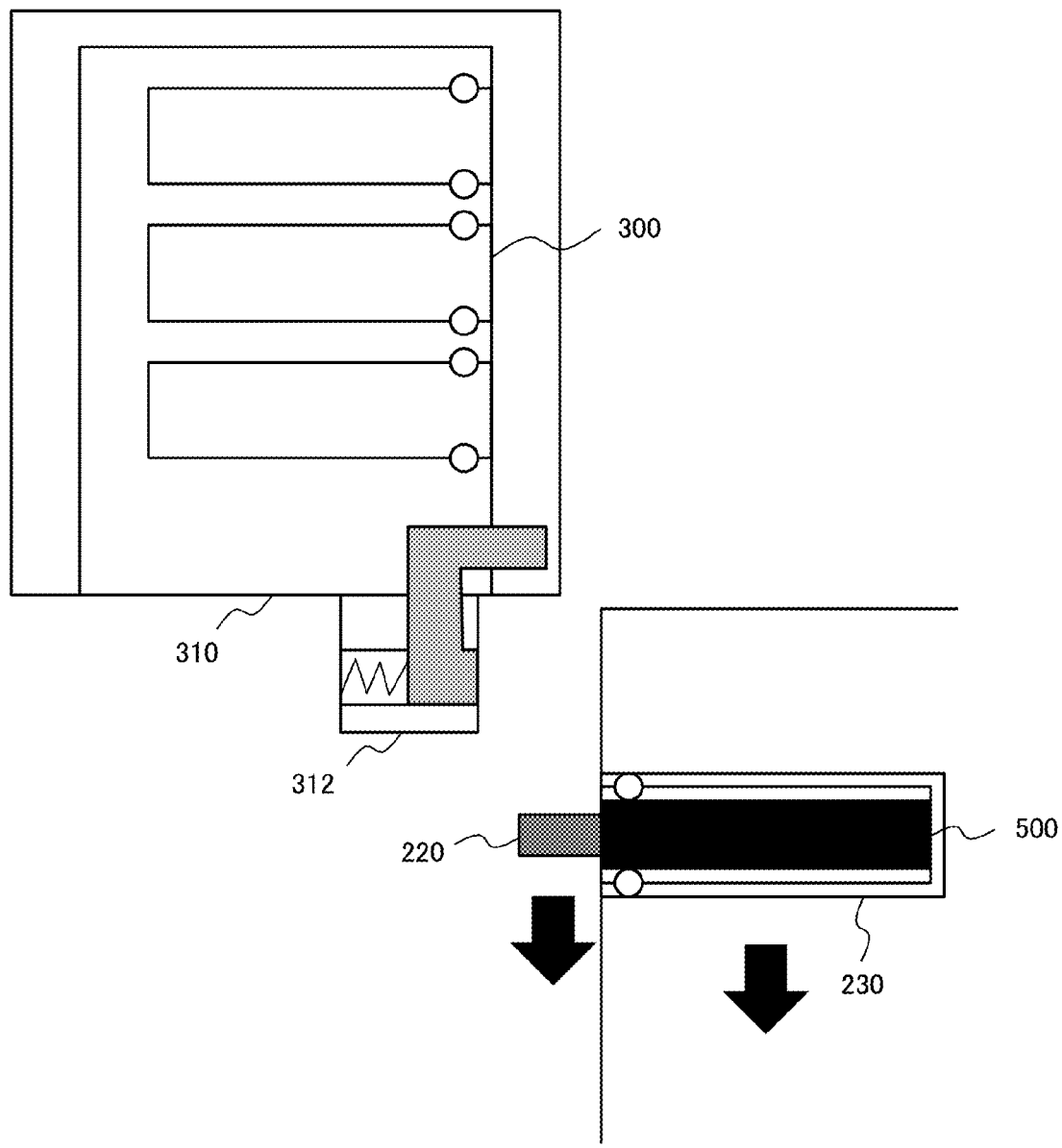
FIG. 15 is a schematic diagram schematically illustrating an operation of adjusting the position of the cartridge picker 230 and the cell unit picker 220 in the z direction after the cartridge 500 is transferred from the cell 300 to the cartridge picker 230 in the library device according to the first exemplary embodiment.

As illustrated in FIGS. 5 and 15, the control unit 110 then controls the cartridge picker slide driving unit 233 and the cell unit picker driving unit 221 to adjust the position of the cartridge picker 230 and the cell unit picker 220 in the z direction. Then, the cartridge picker 230 and the cell unit picker 220 move to a predetermined position where they are not caught by the cell unit hook 312 of the cell unit 310.

The control unit 110 then controls the robot height adjustment unit 201 to adjust the cartridge picker stage 234 to a position at a predetermined height where an end of the cartridge picker stage 234 in the z direction is not caught by the cell unit hook 312 of the cell unit 310. The cartridge picker stage 234 may be located in any position in the x direction. A fixed home position of the cartridge picker stage 234 may be set optionally for non-operation state, and the cartridge picker stage 234 may move after the height of the cartridge picker stage 234 is adjusted, or may not move.

With the above process, the library device 100 ends the operation of transferring the cartridge 500 from the cell 300 to the cartridge picker 230. Note that the operation of transferring the cartridge 500 from the cartridge picker 230 to the cell 300 is the reverse of the operation described above. Specifically, the control unit 110 controls the directions of the rotations of the cell cartridge carriers 301a and 301b, and the cartridge carriers 231a and 231b so as to unload the cartridge 500 from the cartridge picker 230 and load the cartridge 500 into the cell 300.

FIGS. 16 to 20 are schematic diagram schematically illustrating an operation of transferring the cartridge 500 from the cartridge picker 230 to the drive 400 in the library device 100 according to the first exemplary embodiment. Note that the process according to the flowchart may also be executed on the basis of program control by the CPU 11 as described previously.

Figure 16:
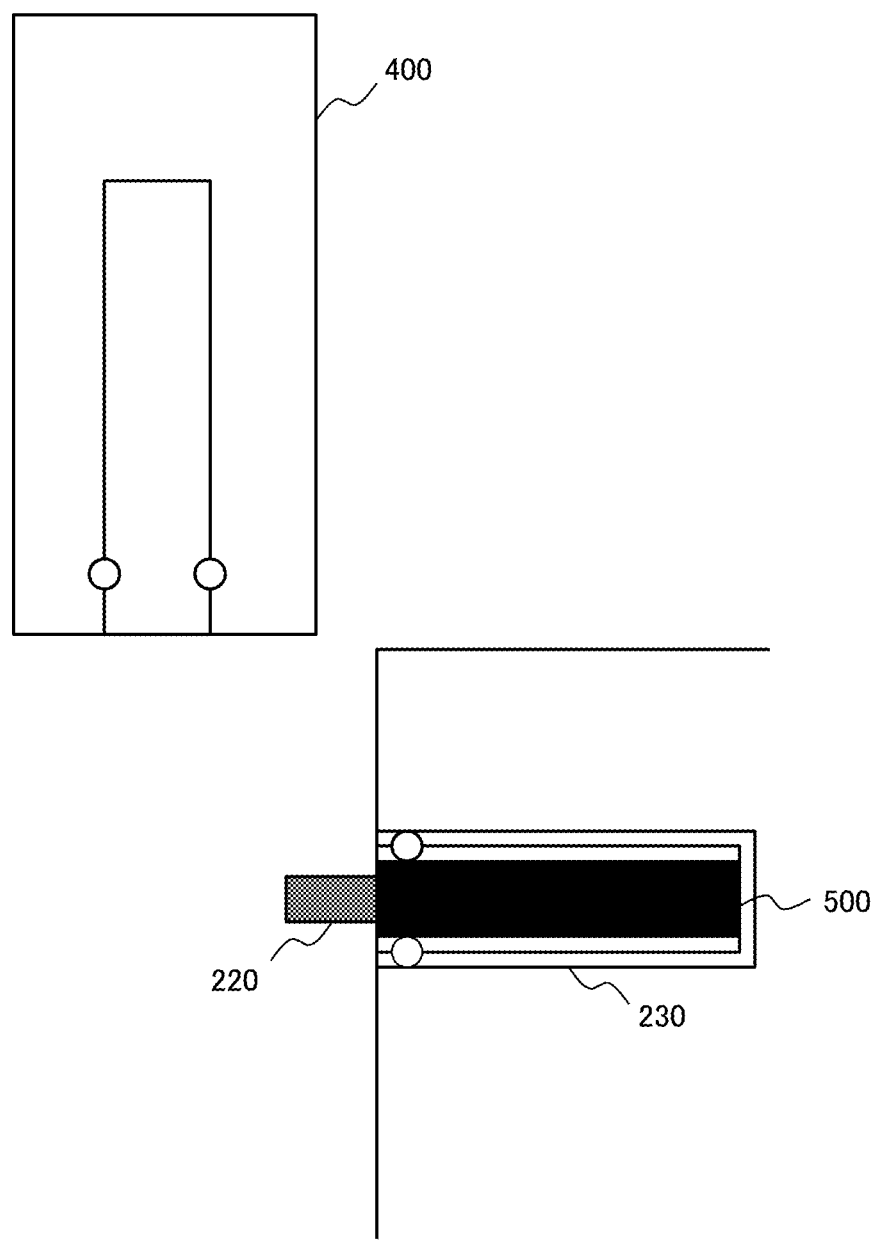
FIG. 16 is a schematic diagram schematically illustrating an operation before the cartridge 500 is transferred from the cartridge picker 230 to a drive 400 in the library device 100 according to the first exemplary embodiment.

First, when the robot 200 is not in operation, the cartridge picker stage 234 is fixed at a predetermined height at which the end of the cartridge picker stage 234 in the z direction (the end closer to the rack) is not caught by the cell unit hook 312 of a cell unit 310 as described previously. The cartridge picker 230 and the cell unit picker 220 are fixed at a predetermined position where they are not caught by the cell unit hook 312 of the cell unit 310. The cartridge picker stage 234 may be located in any position in the x direction. Then, the robot 200 is positioned so that the cartridge picker 230 is located near the target drive 400 (one of a plurality of drives) as illustrated in FIG. 16.

Figure 17:
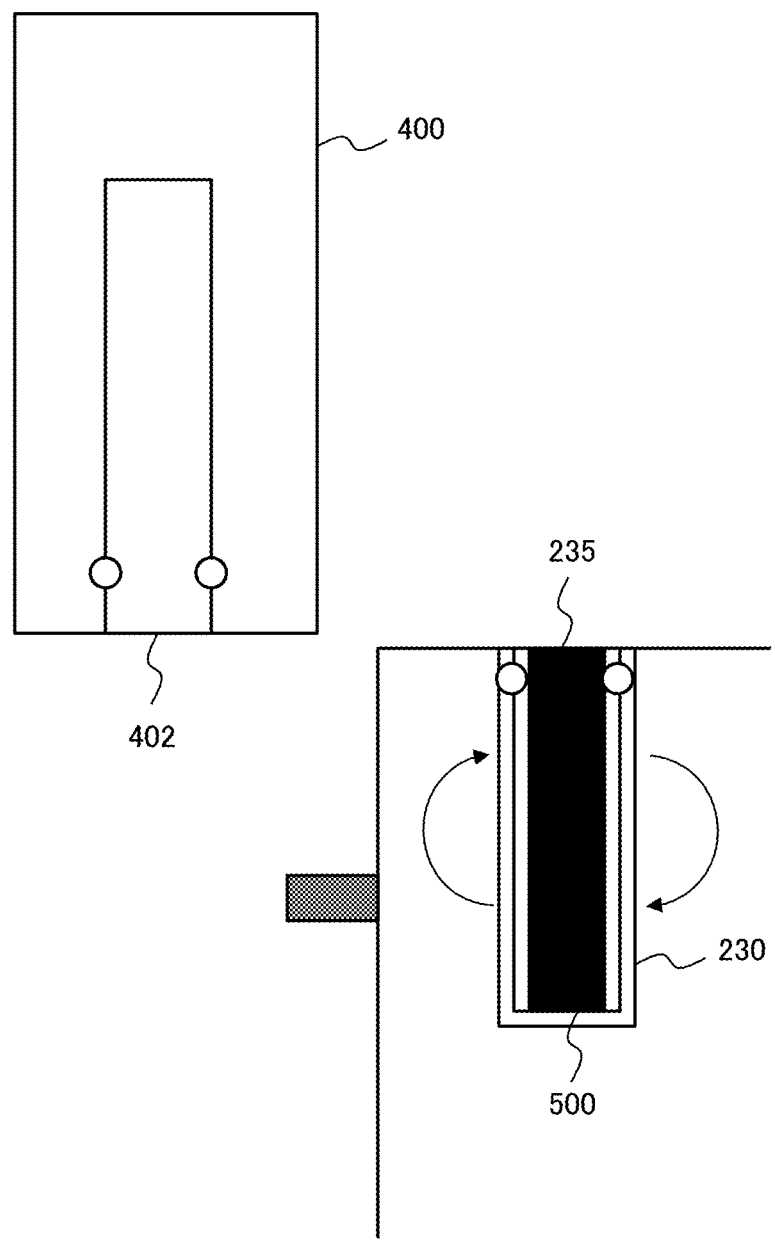
FIG. 17 is a schematic diagram schematically illustrating an operation of rotating the cartridge picker 230 before the cartridge 500 is transferred from the cartridge picker 230 to the drive 400 in the library device 100 according to the first exemplary embodiment.

As illustrated in FIGS. 5 and 17, the control unit 110 first controls the cartridge picker rotation driving unit 232 to rotate the cartridge picker 230 so that the cartridge picker opening 235 is located opposite to the drive opening 402 of the target drive 400. During the rotation, it is ensured that the cartridge picker 230 does not come into contact with the cell unit hook 312 and the cell unit 310. Specifically, the control unit 110 controls the cartridge picker slide driving unit 233 to adjust the position of the cartridge picker 230 in the z direction as appropriate.

Figure 18:
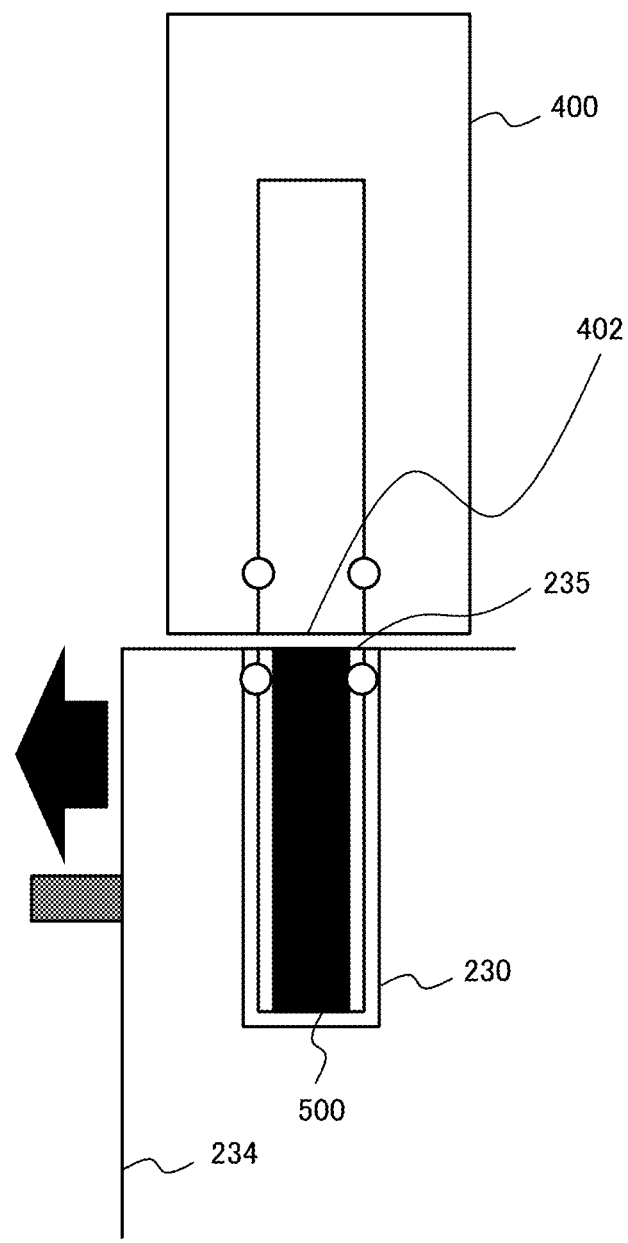
FIG. 18 is a schematic diagram schematically illustrating an operation of moving the cartridge picker 230 so that a cartridge picker opening 235 faces a drive opening 402 of a target drive 400 before the cartridge 500 is transferred from the cartridge picker 230 to the drive 400 in the library device 100 according to the first exemplary embodiment.
Figure 19:
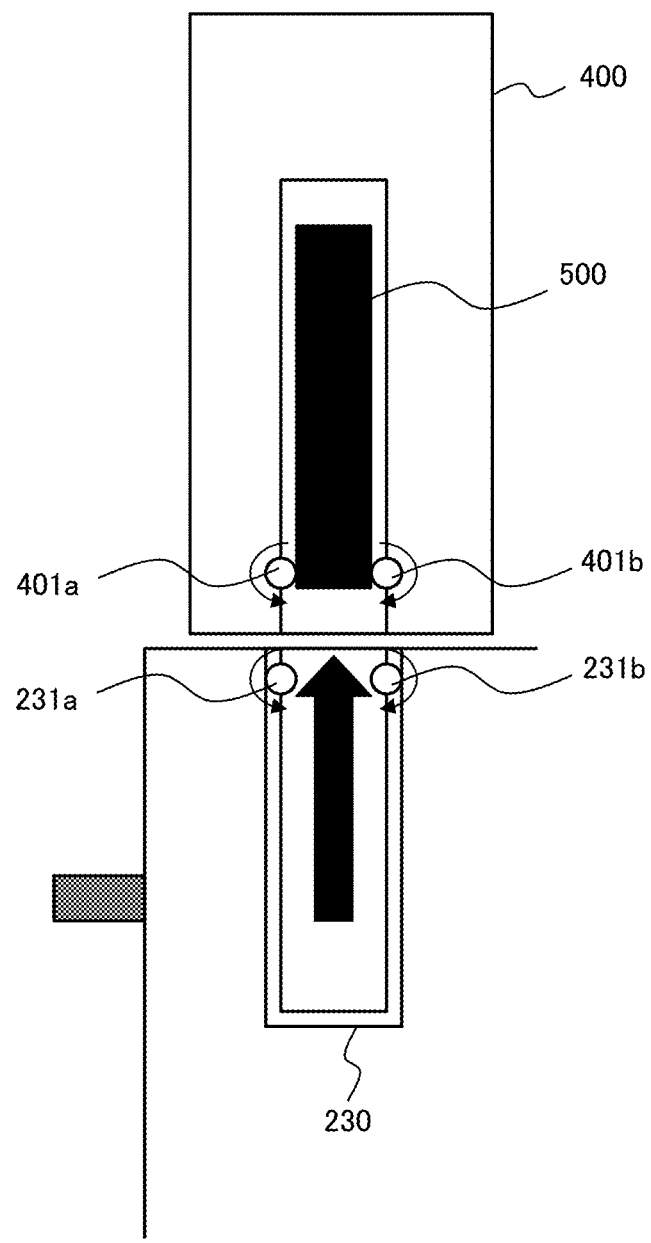
FIG. 19 is a schematic diagram schematically illustrating an operation of transferring the cartridge 500 from the cartridge picker 230 to the drive 400 in the library device 100 according to the first exemplary embodiment.

As illustrated in FIGS. 5 and 18, the control unit 110 then controls the robot slide driving unit 202, the robot height adjustment unit 201, and the cartridge picker slide driving unit 233 to move the cartridge picker 230. The cartridge picker opening 235 is located opposite to the drive opening 402 of the target drive 400. As illustrated in FIGS. 5 and 19, the control unit 110 then performs control to unload the cartridge 500 from the cartridge picker 230 and load the cartridge 500 into the drive 400. Specifically, the control unit 110 controls the rotations of the drive cartridge carriers 401a and 401b (the drive cartridge carriers 401 in FIG. 5) and the cartridge carriers 231a and 231b.

Figure 20:
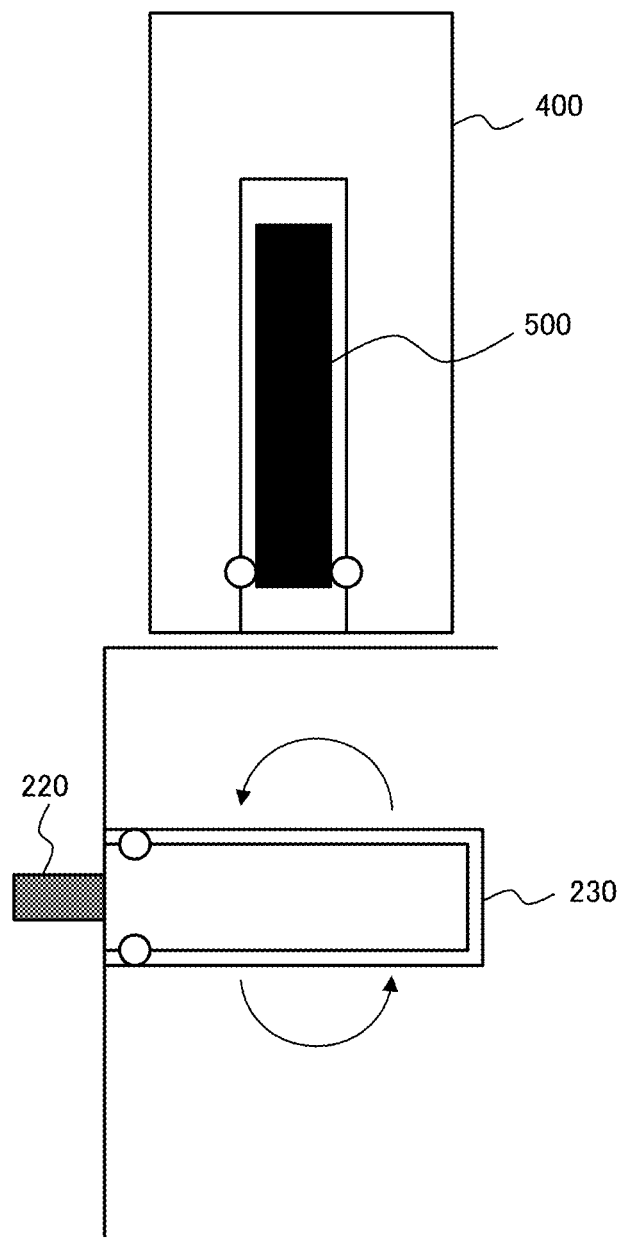
FIG. 20 is a schematic diagram schematically illustrating an operation of rotating the cartridge picker 230 after the cartridge 500 is transferred from the cartridge picker 230 to the drive 400 in the library device 100 according to the first exemplary embodiment.

As illustrated in FIGS. 5 and 20, the control unit 110 then controls the cartridge picker rotation driving unit 232 to rotate the cartridge picker 230 to the original orientation. The original orientation is the orientation in which the cartridge picker opening 235 faces the surface in which the cell unit picker 220 is provided. During the rotation, the control unit 110 controls the cartridge picker slide driving unit 233 as appropriate to adjust the position of the cartridge picker 230 in the z direction to prevent the cartridge picker 230 from coming into contact with the cell unit hook 312 and a cell unit 310.

The control unit 110 then controls the robot height adjustment unit 201 to adjust the cartridge picker stage 234 to a predetermined height at which the end of the cartridge picker stage 234 in the z direction is not caught by the cell unit hook 312 of the cell unit 310. The cartridge picker stage 234 may be located in any position in the x direction. A fixed home position of the cartridge picker stage 234 may be set optionally for non-operation state, and the cartridge picker stage 234 may move after the height of the cartridge picker stage 234 is adjusted, or may not move.

With the above process, the library device 100 ends the operation for transferring the cartridge 500 from the cartridge picker 230 to the drive 400. Note that the operation of transferring the cartridge 500 from the drive 400 to the cartridge picker 230 is the reverse of the operation described above. Specifically, the control unit 110 controls the directions of the rotations of the drive cartridge carriers 401a and 401b, and the cartridge carriers 231a and 231b so as to unload the cartridge 500 from the drive 400 and load the cartridge 500 into the cartridge picker 230.

The configuration of the library device according to the present invention is not limited to the exemplary embodiment described above. For example, the cell unit picker 220 of the second mechanism is driven by its own power using the cell unit picker driving unit 221 to move along the cell unit picker slide rail 222. However, an endless belt, instead of the cell unit picker slide rail 222, may be used as the second mechanism, by fixing the cell unit picker 220 on the belt, and moving the cell unit picker 220 by the rotation of the belt.

Further, the cell unit picker 220 may be controlled to fully pull out the cell unit 310 in the z direction and then unload a cartridge 500.

Further, device which transfers a cartridge between a cell unit 310 and the cartridge picker 230 in the third mechanism is not limited to transfer rollers such as the cartridge carriers 231a and 231b, and the cell cartridge carriers 301a and 301b. For example, the device which transfers a cartridge between the cell unit 310 and the cartridge picker 230 may be a robot hand that grabs and takes out a cartridge 500 from the cell 300. In other words, the cartridge picker 230 may be a robot hand capable of unloading and loading the cartridge 500 from and into the cell 300 of the cell unit 310 and the drive 400.

Further, the installation location of the drives 400 is not limited to the center of the width direction of the rack 1000; the drives 400 may be installed in other location.

The robot slide rail 204 and the robot leg 203 of the robot 100 may be provided on the ceiling. In that case, the cartridge picker 230 is suspended from the ceiling and moves around. This enables effective use of the floor.

Advantageous effects of the first exemplary embodiment of the present invention will now be described.

The library device according to the exemplary embodiment described above is capable of achieving improved operational stability and installation flexibility, and is capable of holding an increased number of cartridges regardless of the number of robots.

This is because the library device includes the following configuration. Firstly, it is possible to increase the number of cartridges that each cell unit can hold in the depth direction (the z direction) of the rack of the library device and therefore it is possible to reduce an increased width (in the x direction) of the rack of the library device. Secondly, it is possible to minimize the travel distance of the robot and prevent a decrease in voltage and deterioration of the quality of signals supplied to the robot. This will improve the operational stability of the robot. Since it is possible to reduce the increased width of the rack of the library device, the flexibility of installation is increased. Furthermore, the robot can unload a cartridge at any position in the depth direction of the rack by pulling out a cell unit.

[Variation]

Figure 21:
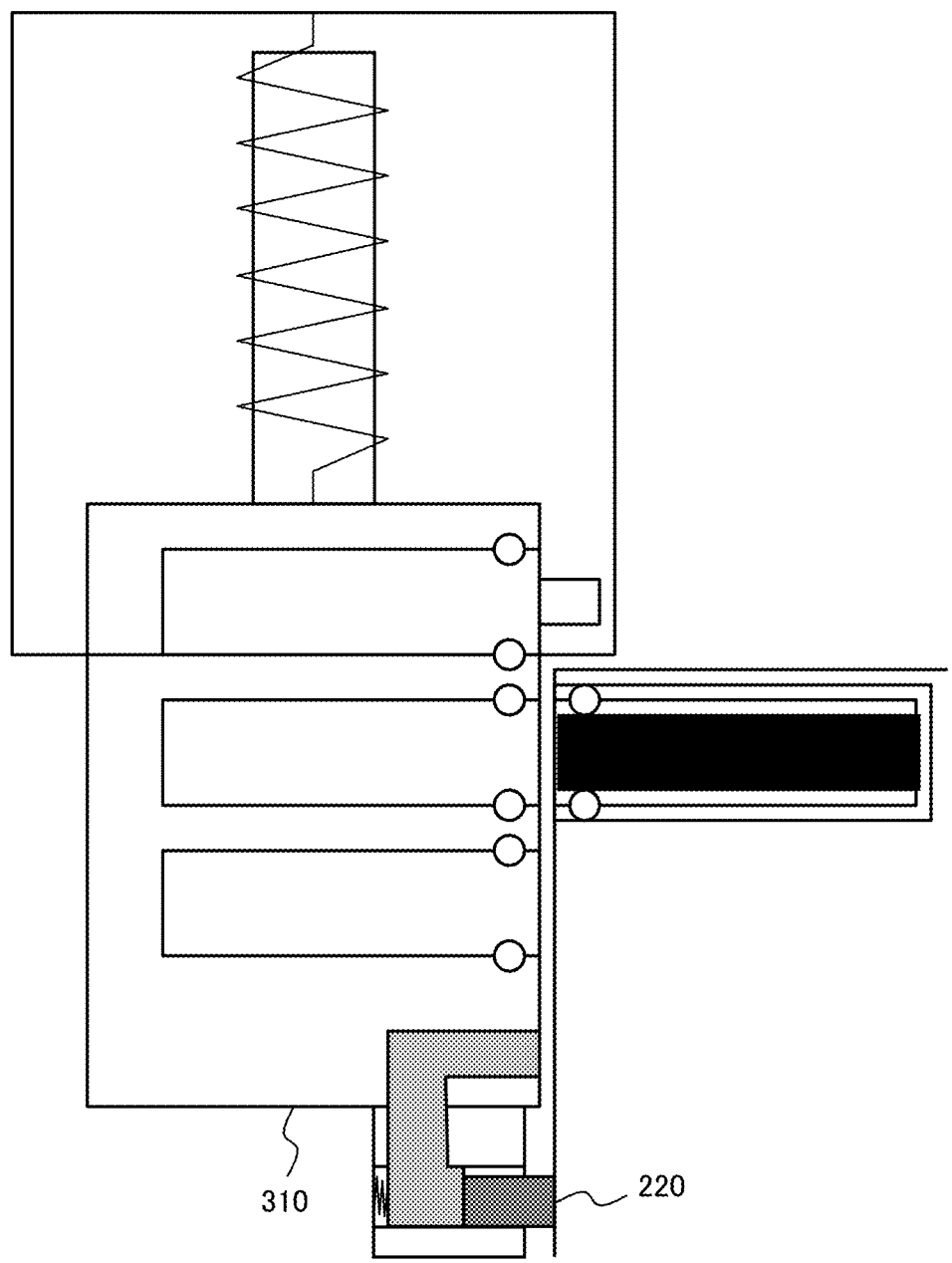
FIG. 21 is a schematic diagram schematically illustrating a state in which a cell unit 310 is pulled out by the cell unit picker 220 in a library device 100 according to a variation.
Figure 22:
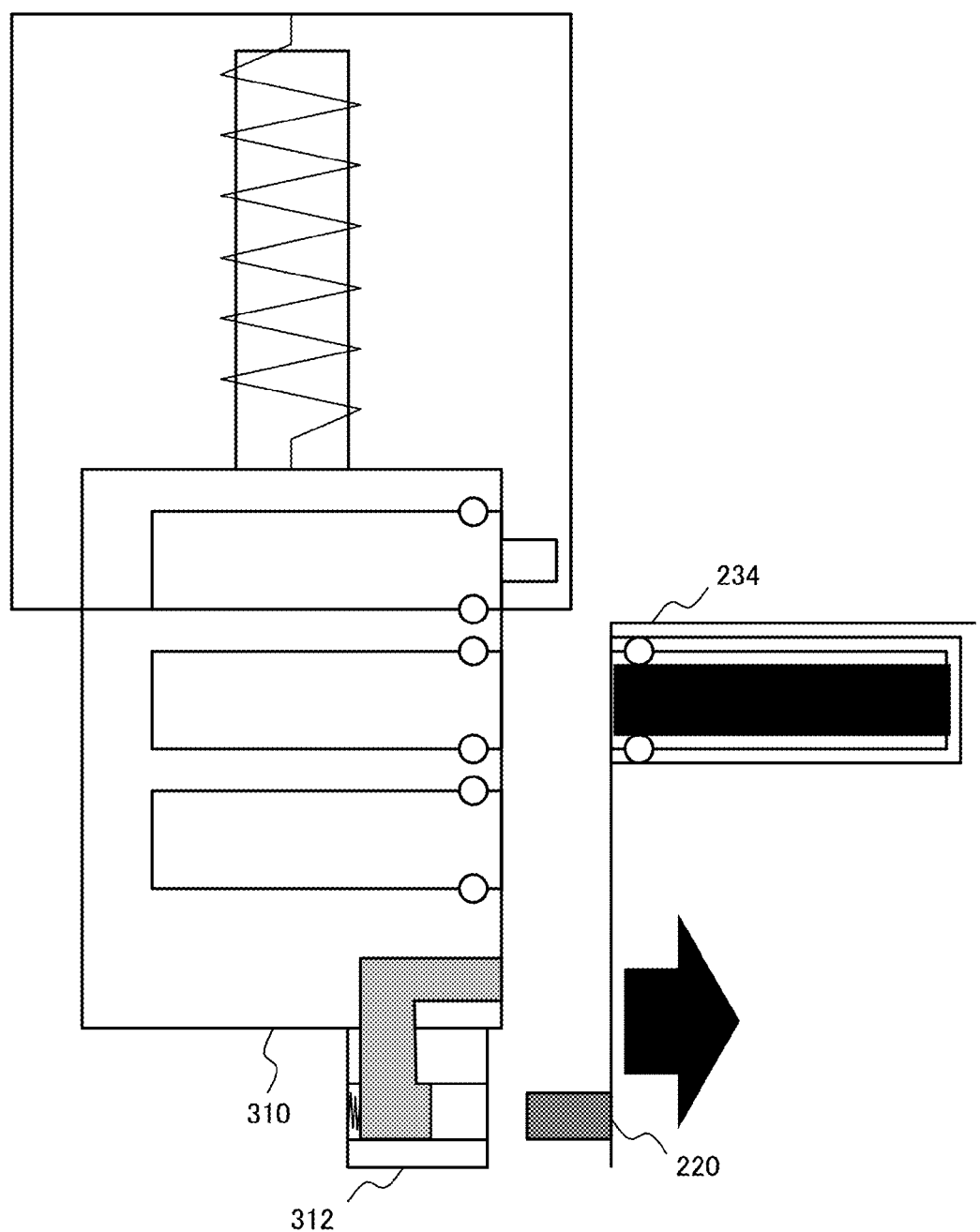
FIG. 22 is a schematic diagram schematically illustrating an operation of moving a cartridge picker stage 234 in the x direction in which the cell unit picker 220 is pulled out of the cell unit hook 312 after the state illustrated in FIG. 21 in the library device 100 according to the variation.

According to the present invention, a mechanism such as a spring or an elastic body can be used between the cell unit 310 and the inside of the rack 1000, or at the cell unit slide rail 314 to automatically insert the pulled out cell unit 310 into the rack 1000. To implement this, given members, for example, the sidewall at the back side of the cell unit 310 in the z direction and the inner sidewall of the rack 1000 that faces the sidewall are connected by a mechanism such as a spring or an elastic body (retracting device) as illustrated in FIG. 21. When the cell unit 310 is pulled out, the mechanism such as the spring or the elastic body extends. As a result, the mechanism such as the spring or the elastic body applies tension to the cell unit 310 in the direction in which the cell unit 310 is inserted (retracting direction). Accordingly, when the cell unit picker 220 pulls out the cell unit 310 as illustrated in FIG. 21 and then the cell unit picker 220 is pulled out of the cell unit hook 312 as illustrated in FIG. 22, the cell unit 310 is automatically inserted into the rack 1000 by the resilience of the spring.

Figure 23:
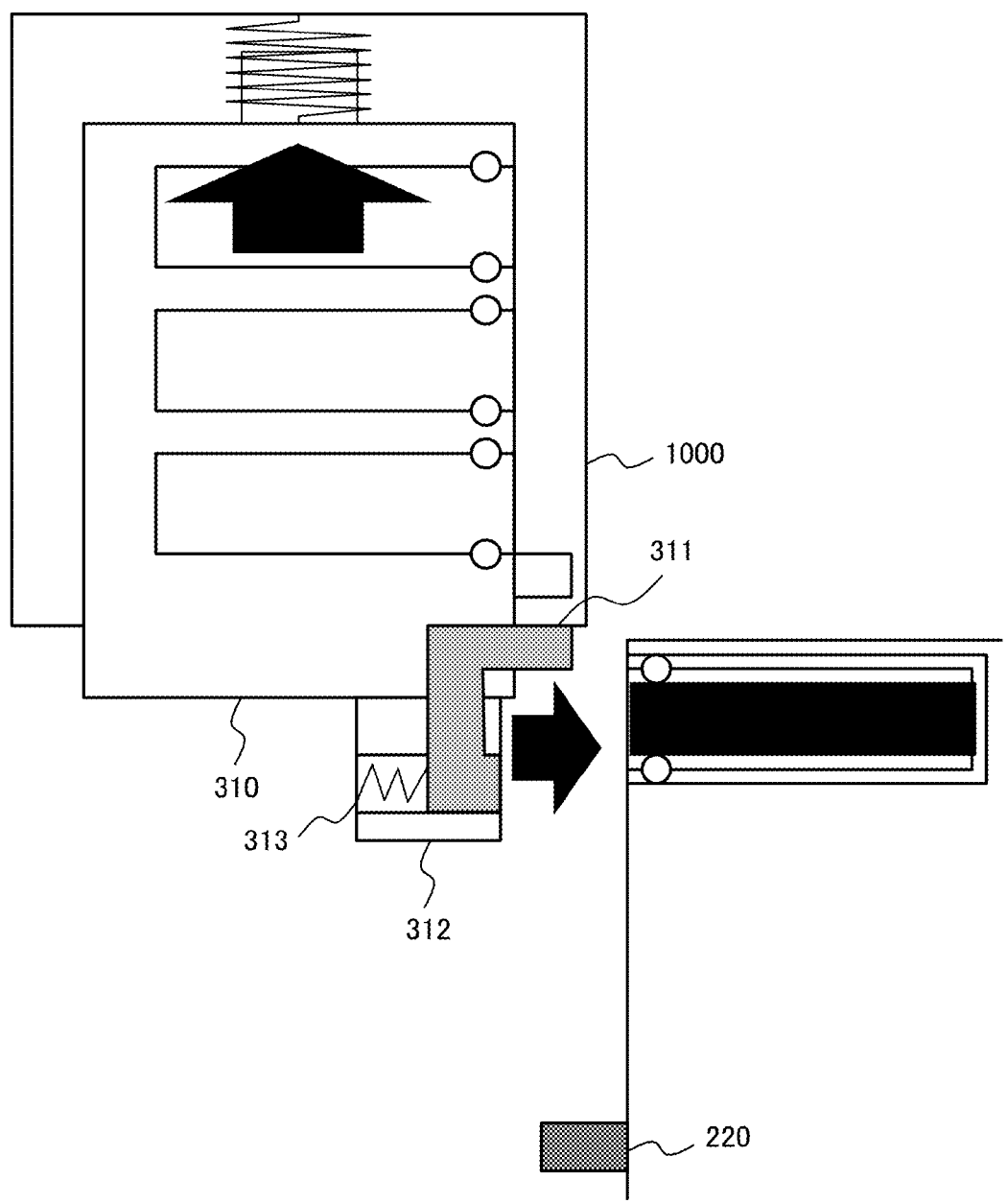
FIG. 23 is a schematic diagram schematically illustrating a state in which a protruding cell unit lock 311 is in contact with the rack 1000 to hinder loading into the rack 1000 after the operation of FIG. 22 in the library device 100 according to the variation.
Figure 24:
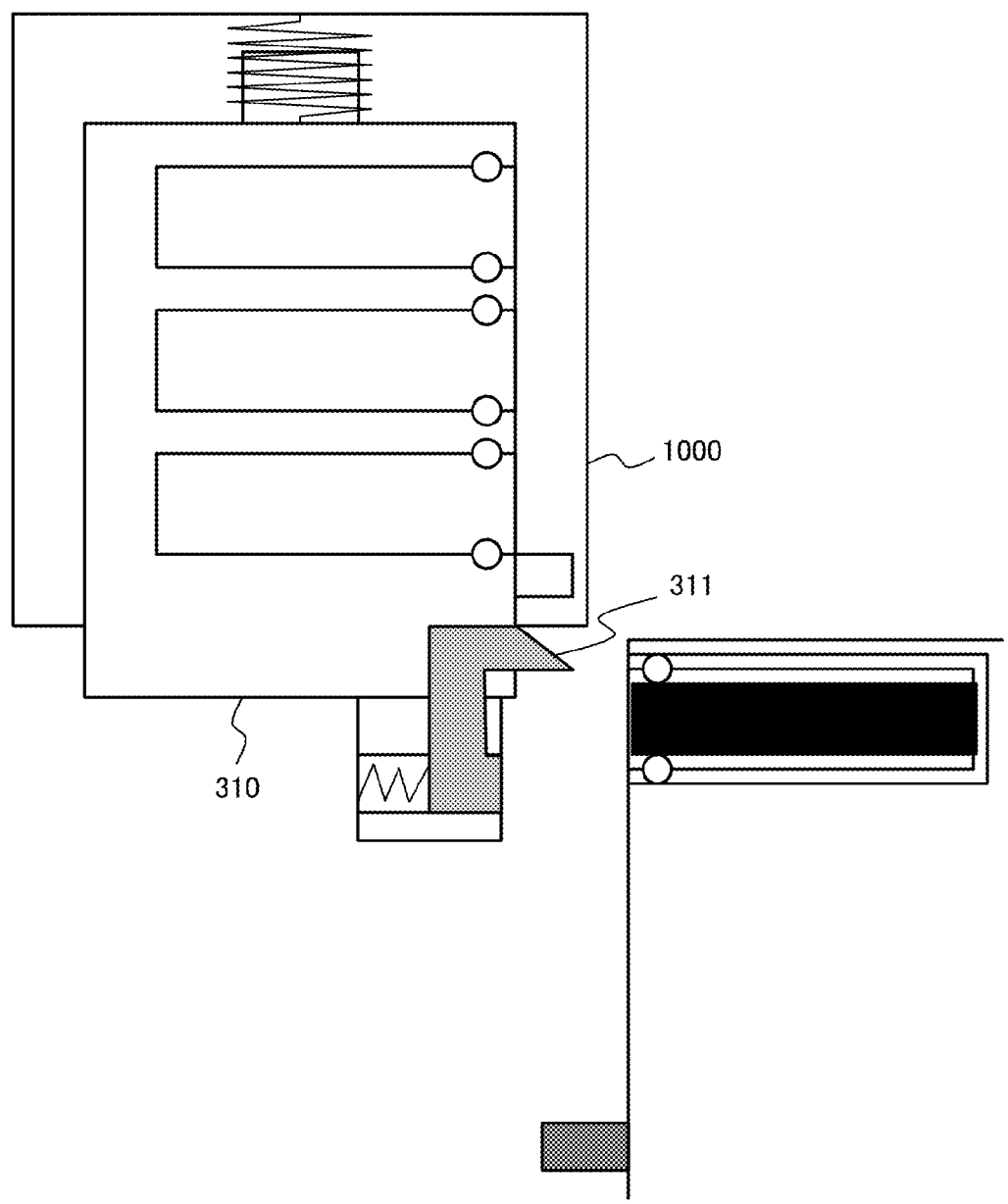
FIG. 24 is a schematic diagram illustrating another example of a cell unit lock 311 in the library device 100 according to the variation.
Figure 25:
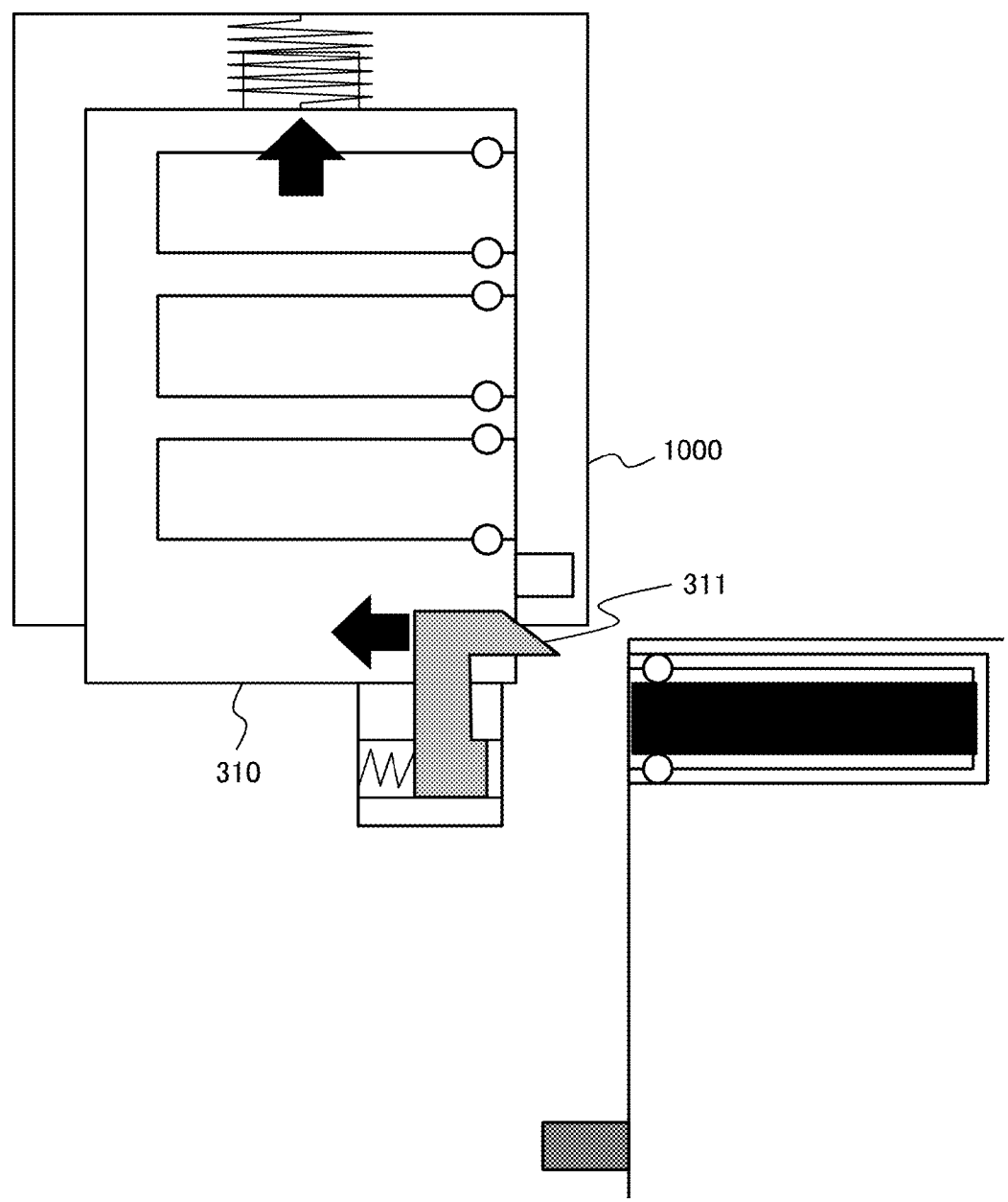
FIG. 25 is a schematic diagram schematically illustrating an operation in which the cell unit lock 311 in the state in FIG. 24 comes into contact with the rack 1000 to push the cell unit lock 311 in the x direction along a cut surface of a protruding portion of the cell unit lock 311 in the library device 100 according to the variation.
Figure 26:
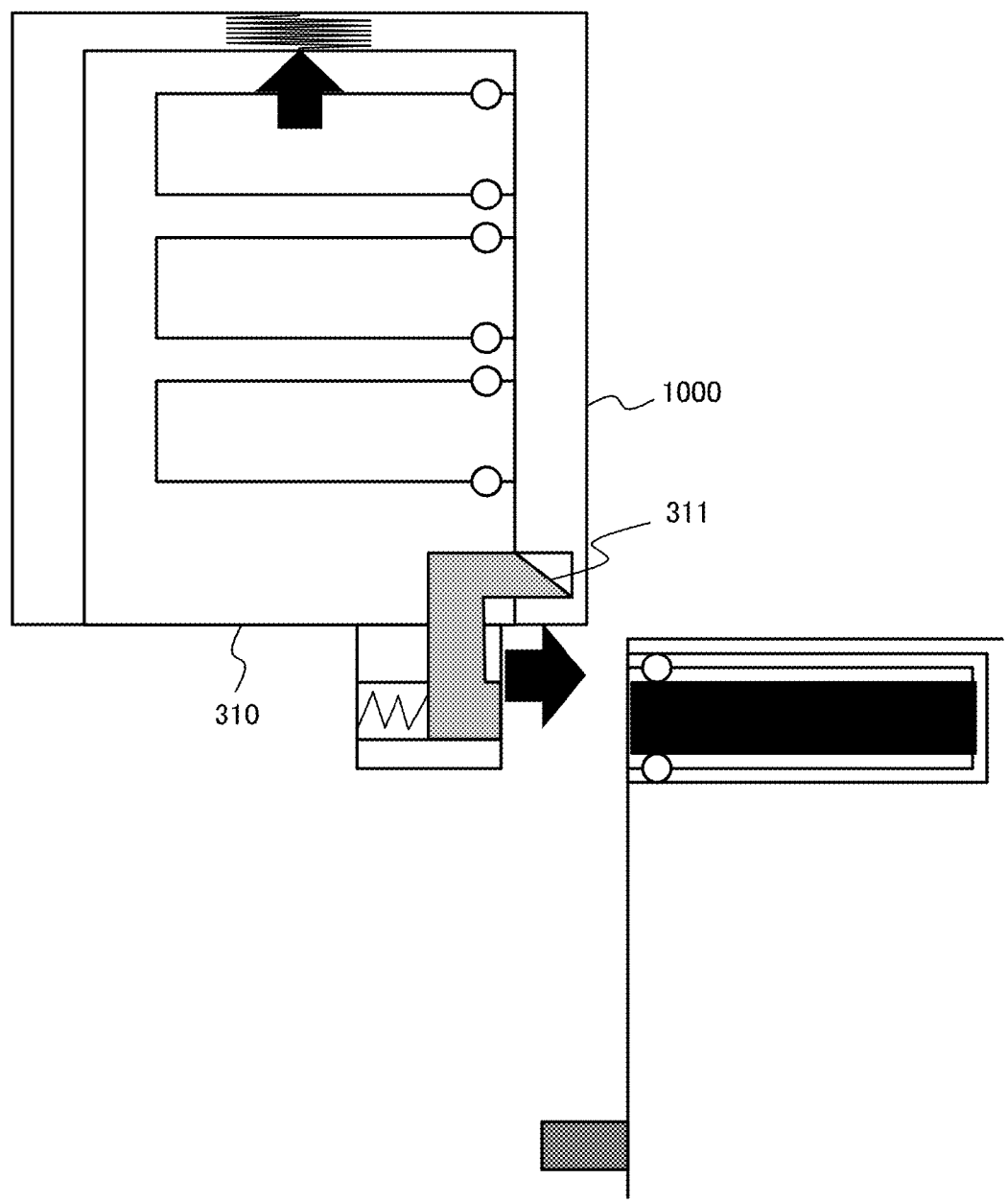
FIG. 26 is a schematic diagram schematically illustrating an operation in which the cell unit 310 is automatically loaded into the rack 1000 after the operation of FIG. 25 in the library device 100 according to the variation.

However, at the time when the cell unit picker 220 is pulled out of the cell unit hook 312, the cell unit lock 311 protrudes from the cell unit 310 by the tension of the cell unit lock spring 313 as illustrated in FIG. 23. The protruding cell unit lock 311 comes into contact with the rack 1000 to inhibit the cell unit 310 from being fully inserted into the rack 1000. To prevent this, the portion of the cell unit lock 311 that protrudes from the cell unit 310 is cut diagonally from the point touching the cell unit 310 in the surface in contact with the rack 1000 in the z direction to the end of the protruding portion in the surface in the z direction that is not in contact with the rack 1000 as illustrated in FIG. 24. Thereby, the cell unit lock 311 is pushed in the x direction along the cut surface of the protruding portion of the cell unit lock 311 when the protruding cell unit lock 311 comes into contact with the rack 1000 as illustrated in FIG. 25. As a result, as illustrated in FIG. 26, the cell unit 310 is automatically inserted into the rack 1000 and the cell unit lock 311 can prevent the cell unit 310 from being easily pulled out.

In addition, the library device 100 can include two robots 200. The provision of the two robots 200 enables the library device 100 to concurrently perform two operations such as unloading a cartridge 500 from a cell 300 and unloading a cartridge 500 from a drive 400, thereby, the time required for replacing cartridges in the drive 400 can be reduced.

Furthermore, the library device 100 can be provided with cell units 310 and drives 400 at both left and right sides of a robot 200. The provision of the cell units 310 and the drives 400 on both left and right sides of the robot 200 allows the library device 100 to hold twice as many cell units 310 and drives 400 without extending the length of the library device 100 in the x direction.

One example of operation of a library device 100 including two robots 200 and including cell units 310 and drive units 400 on both left and right sides of the robots 200 will be described with reference to schematic diagrams (top views) in FIGS. 27 to 35. Note that the operation involves unloading a cartridge 510 from a drive 410 and loading the cartridge 510 into a cell 350 of a cell unit 340 on the front side in the z direction while loading a cartridge 520 loaded in a cell 330 of a cell unit 320 on the back side in the z direction into the drive 410. Note that the front side in the z direction refers to the lower side of FIGS. 27 to 35 whereas the back side in the z direction refers to the upper side of FIGS. 27 to 35. The entire operation is performed under the control of a control unit 110 and the description of the control will be omitted. Description of operations of driving units and carriers, and the description of cell unit locks will also be omitted.

Figure 27:
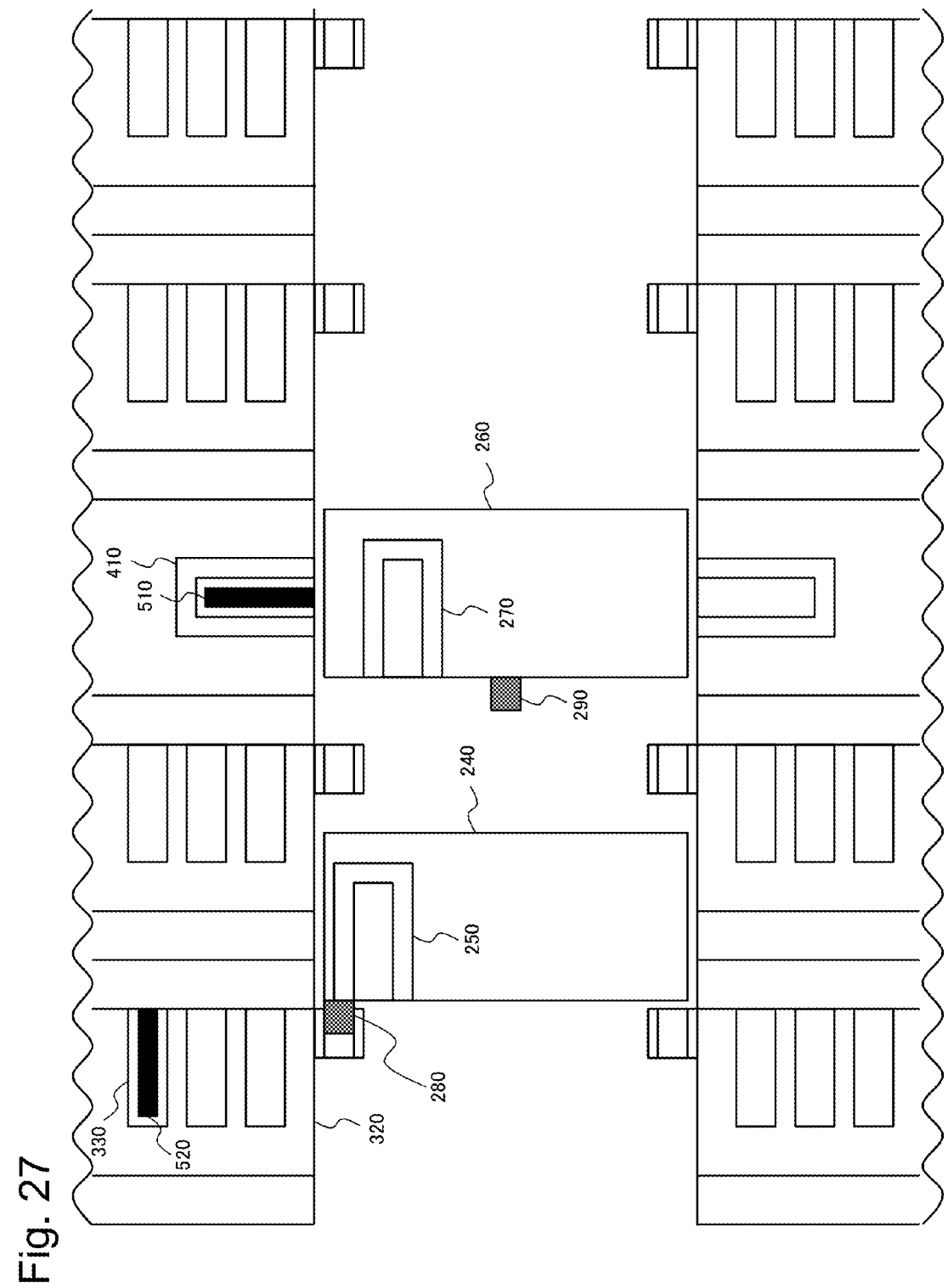
FIG. 27 is a schematic diagram schematically illustrating an operation in which a robot 240 adjusts the x-direction position of the cell unit picker 280 while a robot 260 moves to a location facing a drive 410 from which a cartridge 510 is to be unloaded in the library device 100 according to the variation.

As illustrated in FIG. 27, a robot 240 first adjusts the position of a cell unit picker 280 in the x direction in order to pull out a cell unit 320 containing the cell 330 that holds the cartridge 520 using the cell unit picker 280. On the other hand, a robot 260 moves to a location facing the drive 410 from which the cartridge 510 is to be unloaded.

Figure 28:
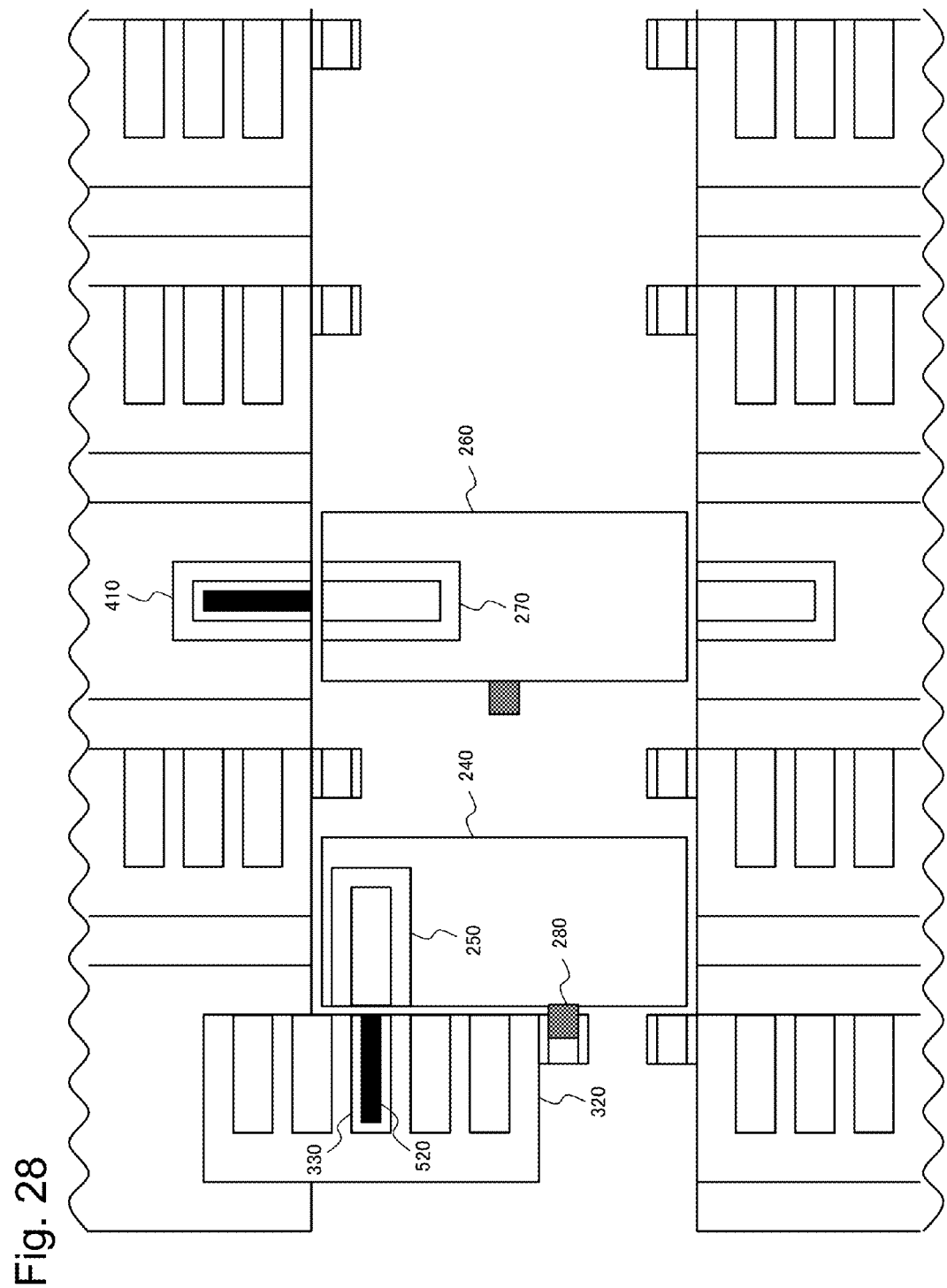
FIG. 28 is a schematic diagram schematically illustrating an operation in which the robot 240 pulls out a cell unit 320 using the cell unit picker 280 while the robot 260 rotates a cartridge picker 270 in the library device 100 according to the variation.

As illustrated in FIG. 28, the robot 240 then pulls out the cell unit 320 in the z direction using the cell unit picker 280 until the cell 330 holding the cartridge 520 faces the cartridge picker 250. The robot 260 rotates a cartridge picker 270 to the orientation in which the cartridge picker 270 faces the drive 410.

Figure 29:
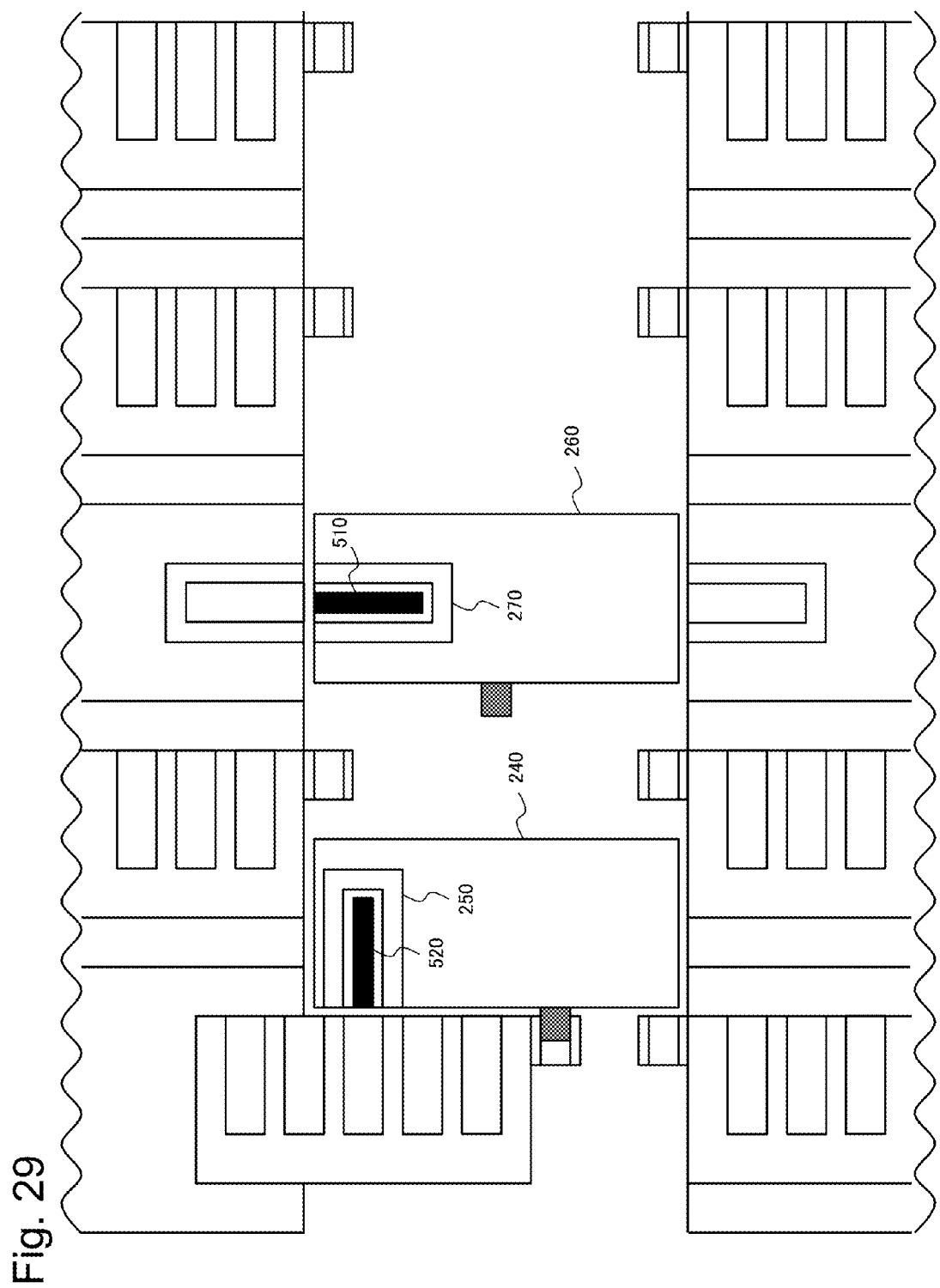
FIG. 29 is a schematic diagram schematically illustrating an operation in which the cartridge picker 250 and the cartridge picker 270 are loaded with a cartridge 520 and a cartridge 510, respectively, in the library device 100 according to the variation.
Figure 30:
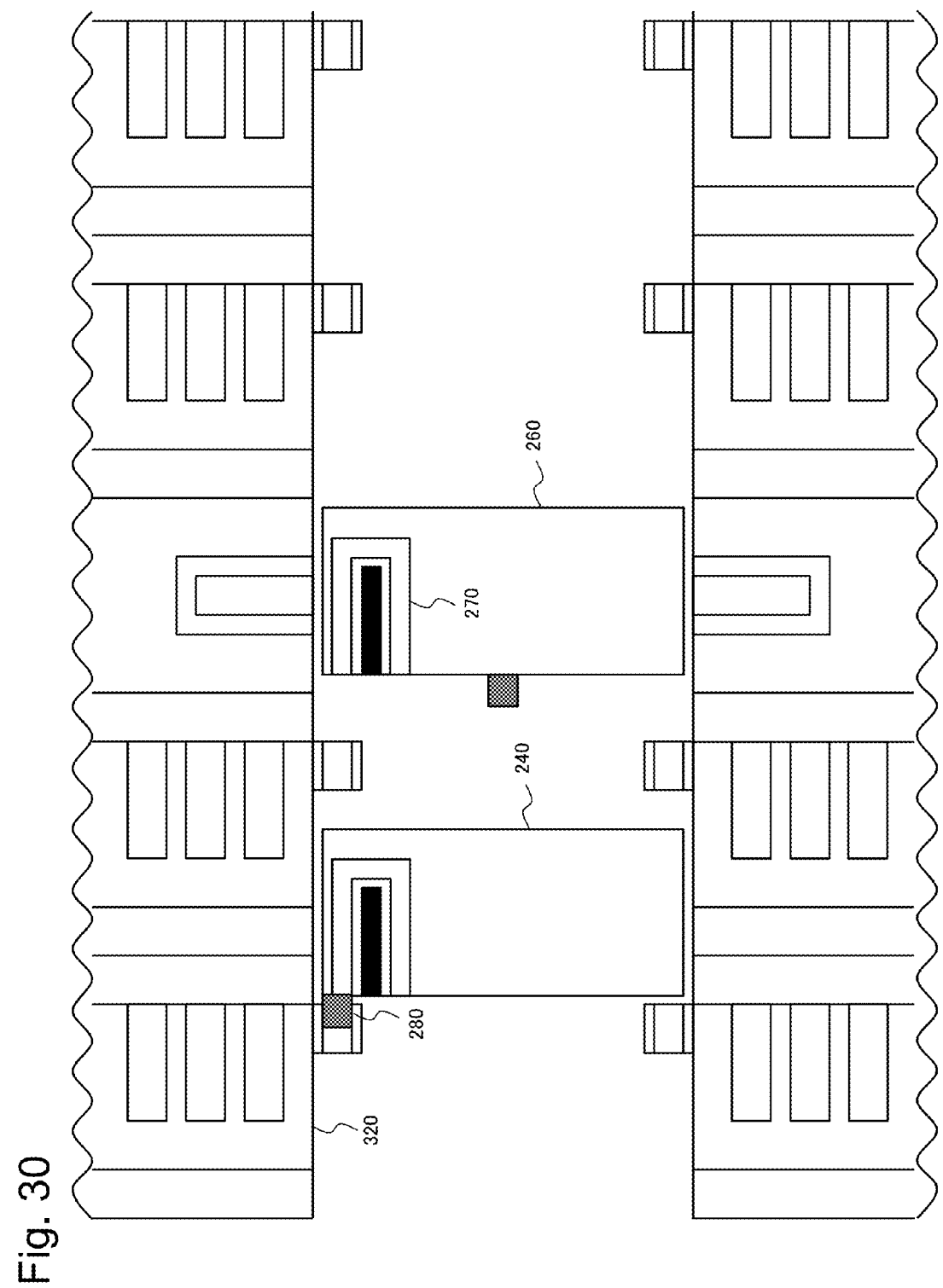
FIG. 30 is a schematic diagram schematically illustrating an operation in which the robot 240 loads the cell unit 320 using the cell unit picker 280 while the robot 260 rotates the cartridge picker 270 to an original orientation in the library device 100 according to the variation.

As illustrated in FIG. 29, then the cartridge picker 250 is loaded with the cartridge 520 while the cartridge picker 270 is loaded with the cartridge 510. As illustrated in FIG. 30, then the robot 240 loads the cell unit 320 using the cell unit picker 280 while the robot 260 rotates the cartridge picker 270 to the original orientation.

Figure 31:
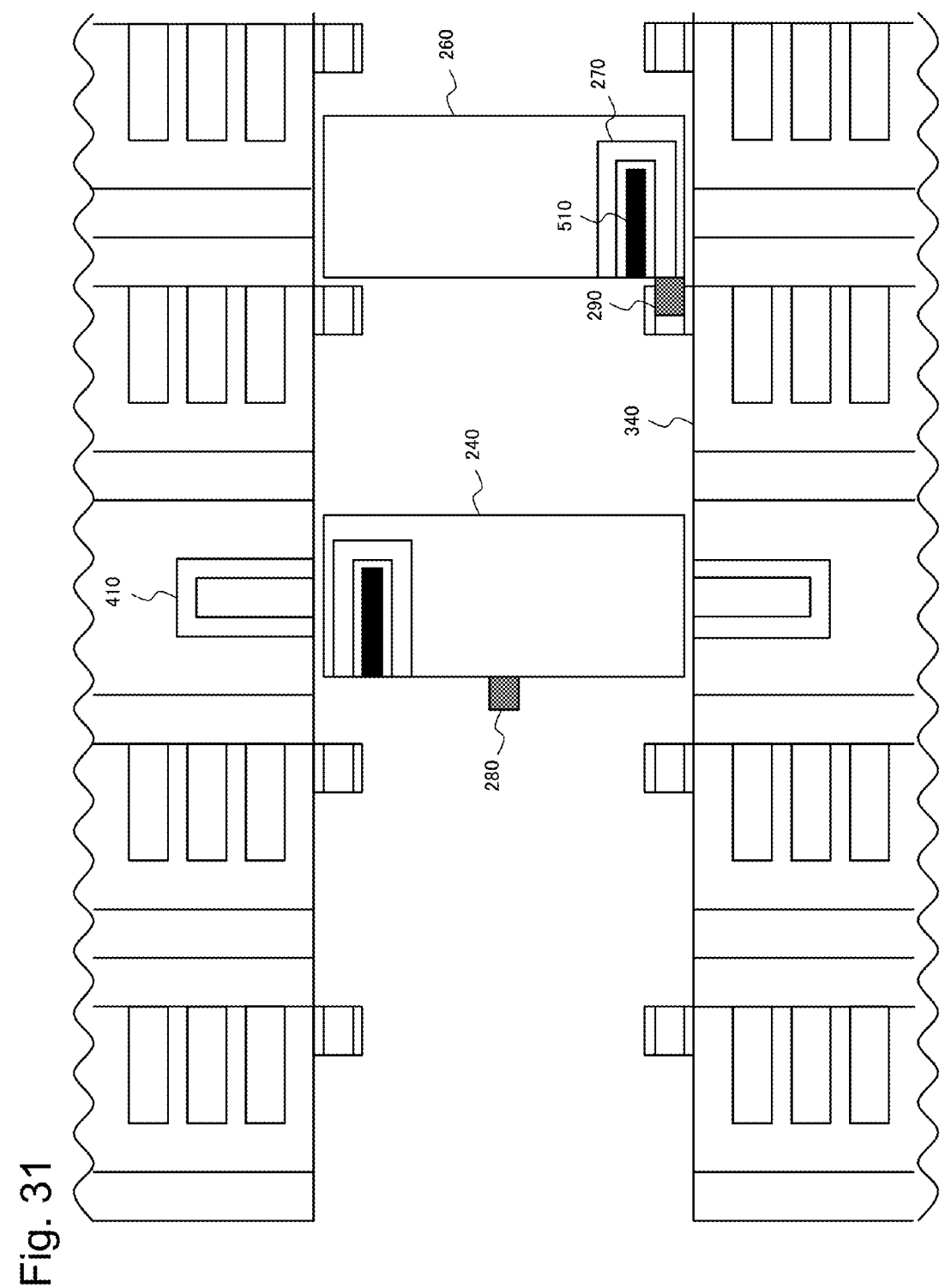
FIG. 31 is a schematic diagram schematically illustrating an operation in which the robot 240 moves to a location facing the drive 410, the robot 260 and a cell unit picker 290 move to a location to pull out a cell unit 340, and the cartridge picker 270 moves to a position in which the cartridge 510 is to be unloaded in the library device 1000 according to the variation.

As illustrated in FIG. 31, the robot 240 then moves to a location facing the drive 410. When moving, the robot 240 moves the cell unit picker 280 to a predetermined position. On the other hand, the robot 260 and the cell unit picker 290 move to a location where they pull out the cell unit 340 and the cartridge picker 270 moves to a location where the cartridge picker 270 unloads the cartridge 510.

Figure 32:
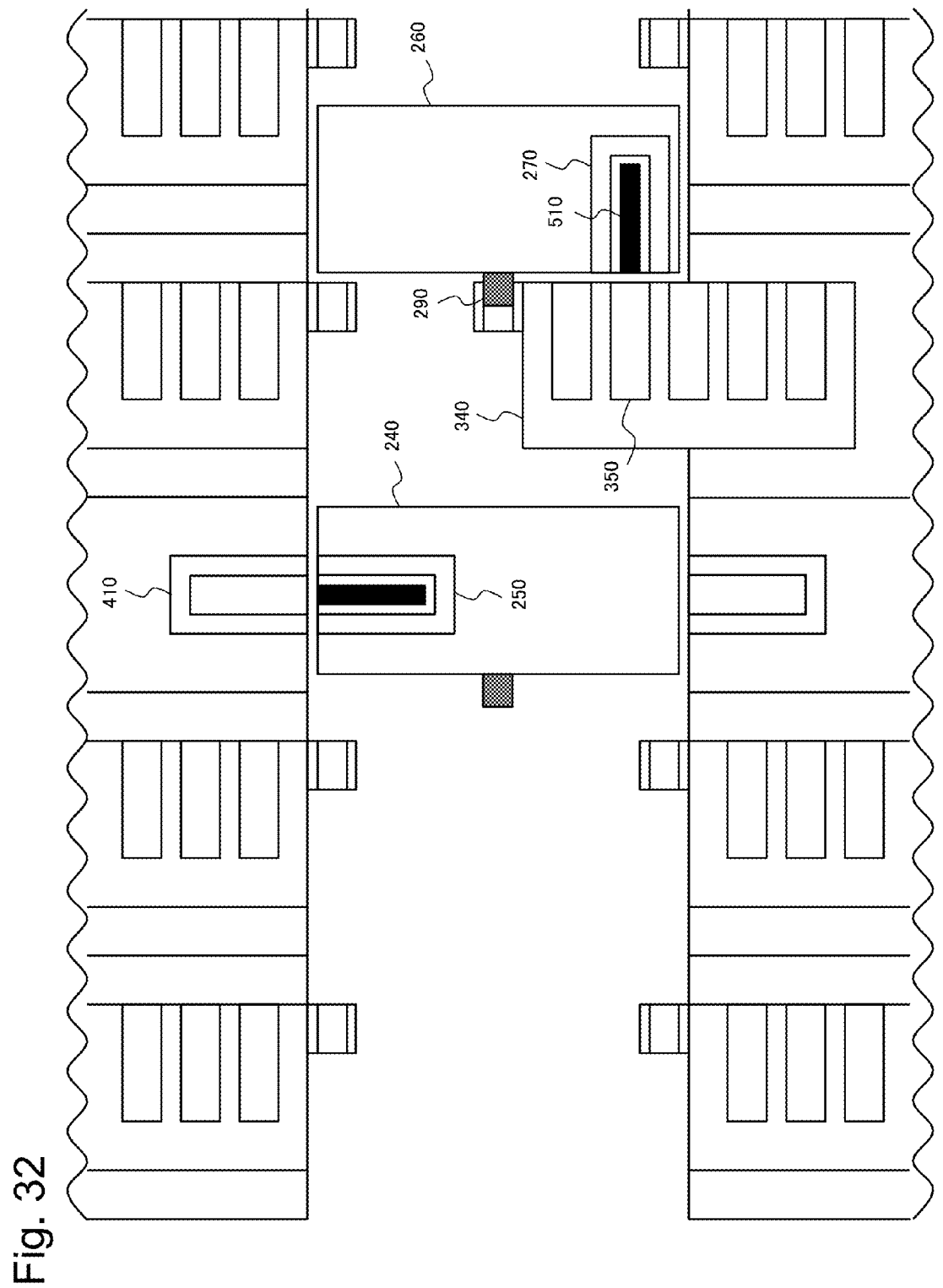
FIG. 32 is a schematic diagram schematically illustrating an operation in which the robot 240 rotates the cartridge picker 250 while the robot 260 pulls out the cell unit 340 using the cell unit picker 290 in the library device 100 according to the variation.

As illustrated in FIG. 32, the robot 240 then rotates the cartridge picker 250 to an orientation in which the cartridge picker 250 faces the drive 410. The robot 260 pulls out the cell unit 340 in the z direction using the cell unit picker 290 until the cell 350 holding the cartridge 510 faces the cartridge picker 270.

Figure 33:
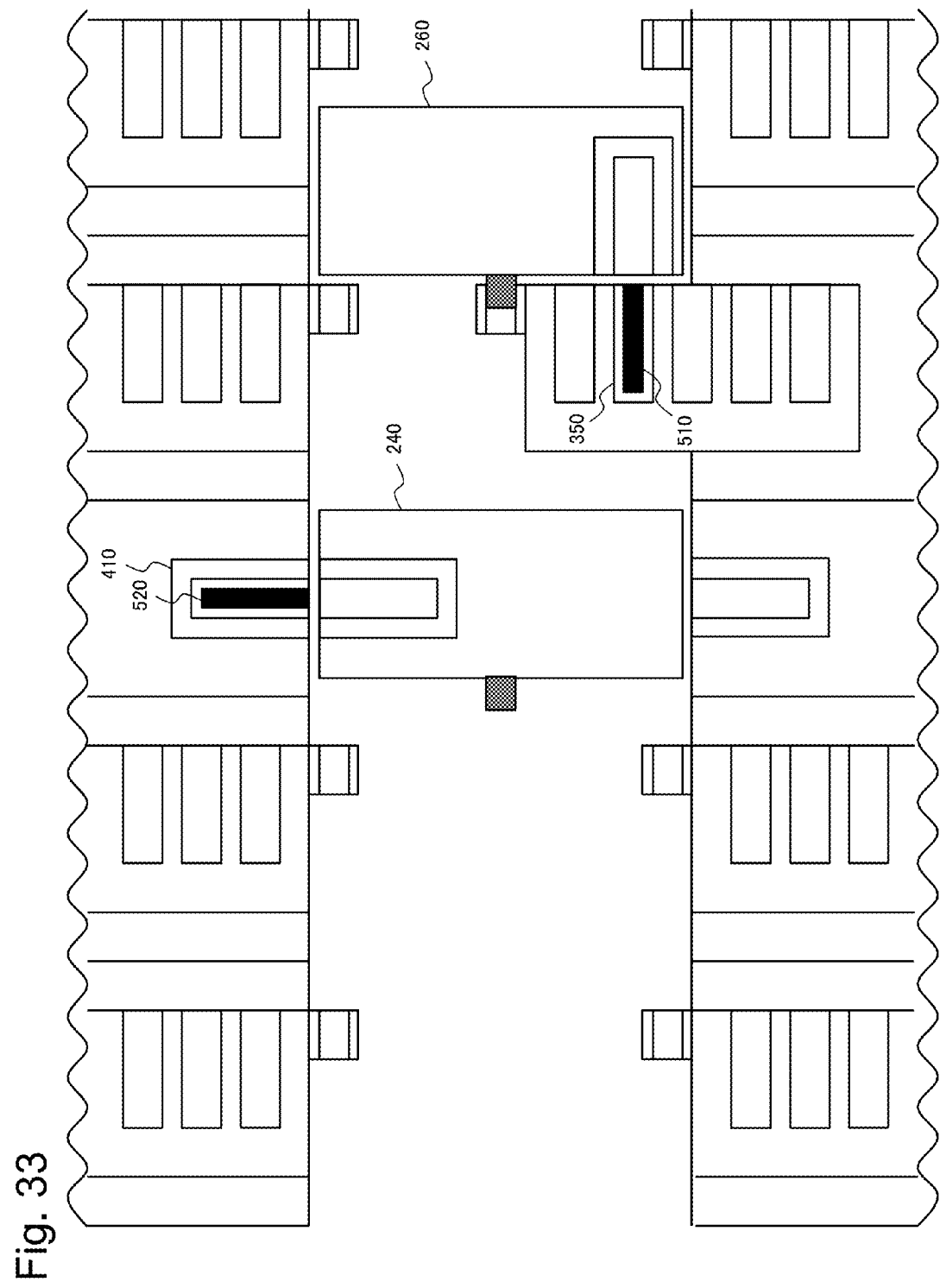
FIG. 33 is a schematic diagram schematically illustrating an operation in which the drive 410 and a cell 350 are loaded with the cartridge 520 and the cartridge 510, respectively, in the library device 100 according to the variation.

As illustrated in FIG. 33, then the drive 410 is loaded with the cartridge 520 while the cell 350 is loaded with the cartridge 510.

Figure 34:
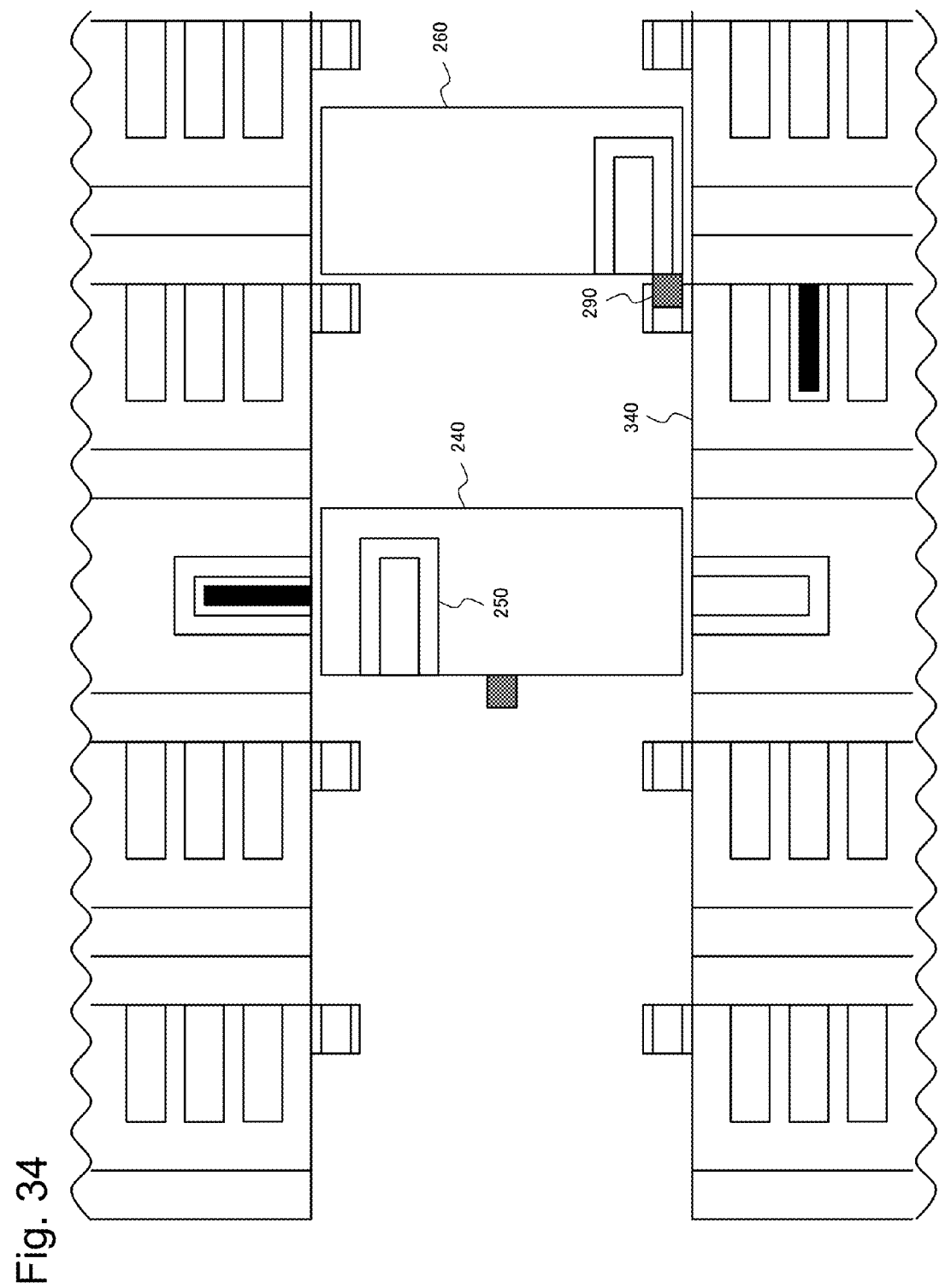
FIG. 34 is a schematic diagram schematically illustrating an operation in which the robot 240 rotates the cartridge picker 250 to the original orientation while the robot 260 loads the cell unit 340 using the cell unit picker 290.

As illustrated in FIG. 34, then the robot 240 rotates the cartridge picker 250 to the original orientation. The robot 260 loads the cell unit 340 using the cell unit picker 290.

Figure 35:
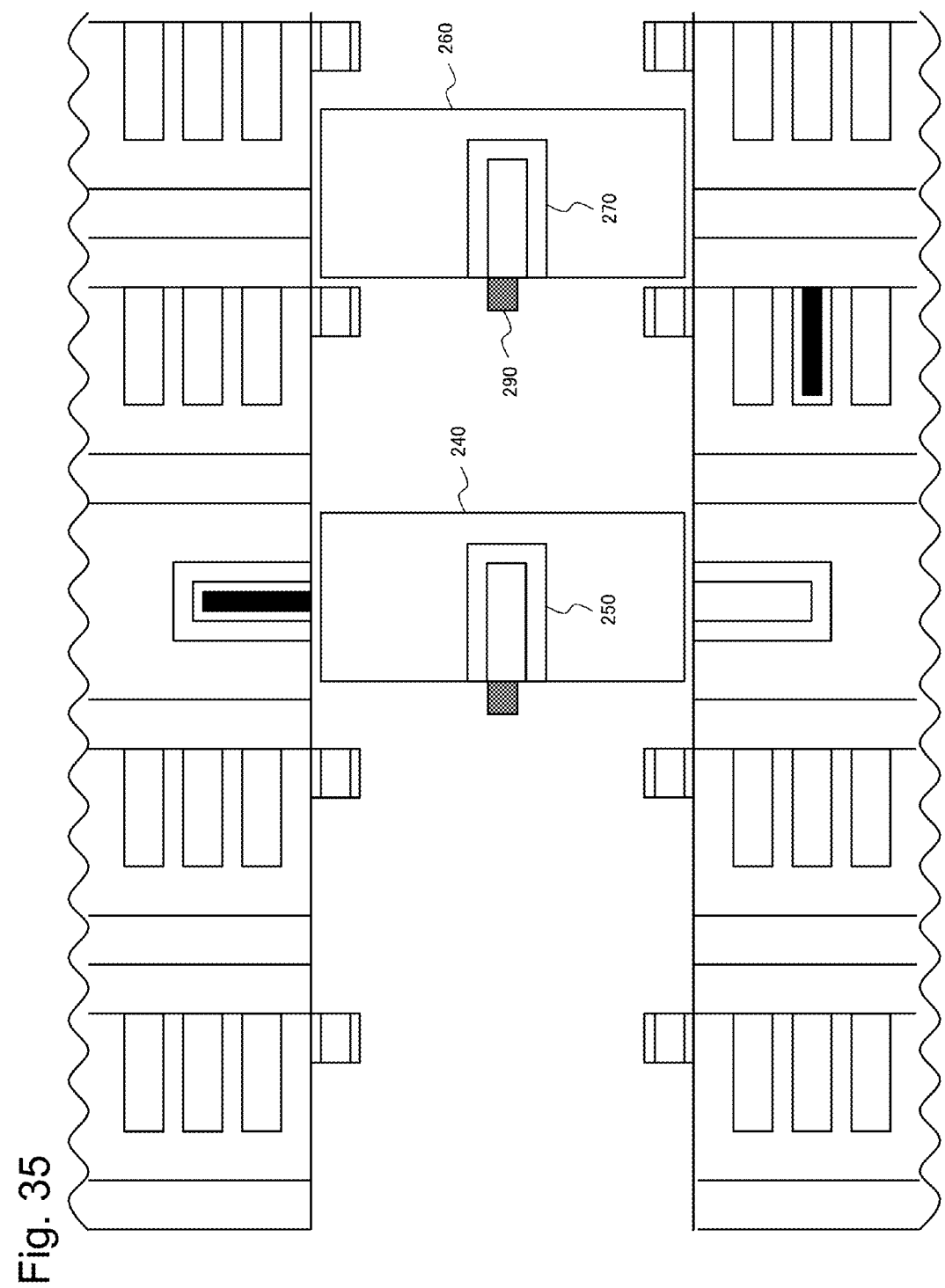
FIG. 35 is a schematic diagram schematically illustrating an operation in which the robot 240 and the robot 260 move the cartridge picker 250 and the cartridge picker 270, respectively, to respective predetermined positions while the robot 260 moves the cell unit picker 290 to a predetermined position.

As illustrated in FIG. 35, then the robot 240 and the robot 260 move the cartridge picker 250 and the cartridge picker 270, respectively, to respective predetermined positions. The robot 260 moves the cell unit picker 290 to a predetermined position.

With the above process, the library device 100 ends the operation of unloading the cartridge 510 from the drive 410 and loading the cartridge 510 into the cell 350 of the cell unit 340 on the front side in the z direction while loading the cartridge 520 loaded in the cell 330 of the cell unit 320 on the back side in the z direction into the drive 410.

An operation similar to the operation described above can be performed by a library device 100 that includes two robots and includes cell units 310 and drives 400 only on one of the both sides of the robots 200 in the z direction. An operation similar to the operation described above can be performed by a library device 100 that includes only one robot 200 and includes cell units 310 and drives 400 both in back and front of the robot 200 in the z direction.

While the present invention has been described with reference to exemplary embodiments thereof, the present invention is not limited to the exemplary embodiments described above. Various modifications understandable to those skilled in the art can be made to the configurations and details of the present invention within the scope of the present invention.

The previous description of exemplary embodiments is provided to enable a person skilled in the art to make and use the present invention. Moreover, various modifications to these exemplary embodiments will be readily apparent to those skilled in the art, and the generic principles and specific examples defined herein may be applied to other exemplary embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:
1. A library device comprising:
cell units each including a plurality of cells each configured to hold a cartridge, the cell units being loaded in a rack in a state where the cell units are arranged at least along a width direction of the rack to be capable of sliding out of the rack; and
a robot adjacent to the rack holding the cell units, the robot configured with a first mechanism of moving the robot at least along the width direction, a second mechanism of pulling out or loading the cell units from or into the rack, and a third mechanism of unloading or loading the cartridge from or into one of the cells while the cell unit is pulled out, and loading or unloading the cartridge into or from a drive operating the cartridge.

2. The library device according to claim 1, wherein
each of the cell units includes a cell unit lock to prevent the cell unit from being pulled out of the rack, and
the second mechanism includes a device which releases a locking of the cell unit lock to prevent from being pulled out of the rack when pulling out one of the cell units.

3. The library device according to claim 1, further comprising a retracting device which applies a force to retract the cell unit in a direction in which the cell unit is loaded into the rack when one of the cell units is pulled out.

4. The library device according to claim 1, wherein the cell unit or the drive is disposed on both side surfaces, back side and front side, of the robot.

5. The library device according to claim 1, further comprising driving units driving the first mechanism, the second mechanism, and the third mechanism, respectively, and a control unit controlling the driving units.

6. A library control method for a library device that is provides with cell units each including a plurality of cells each configured to hold a cartridge, the cell units being loaded in a rack in a state where the cell units are arranged at least along a width direction of the rack to be capable of sliding out of the rack, and a robot adjacent to the rack holding the cell units,
the library control method comprising:
moving the robot at least along the width direction;
pulling out or loading one of the cell units from or into the rack; and
unloading or loading the cartridge from or into one of the cells while the cell unit is pulled out, and loading or unloading the cartridge into or from a drive operating the cartridge.

7. The library control method according to claim 6, further comprising:
locking the cell unit by a mechanism preventing the cell unit from being pulled out of the rack; and
unlocking the cell unit when pulling out one of the cell units.

8. The library control method according to claim 6, further comprising applying a force to retract the cell unit in a direction in which the cell unit is loaded into the rack when the cell unit is pulled out.

9. A computer readable non-transitory recording medium storing a computer program,
causing a computer of a library device that is provided with cell units each including a plurality of cells each configured to hold a cartridge, the cell units being loaded in a rack in a state where the cell unit are arranged at least along a width direction of the rack to be capable of sliding out of the rack, and a robot adjacent to the rack holding the cell units,
to execute the steps of:
controlling a first mechanism of moving the robot at least along the width direction;
controlling a second mechanism of pulling out or loading the cell units from or into the rack; and
controlling a third mechanism of unloading or loading the cartridge from or into one of the cells while the cell unit is pulled out, and loading or unloading the cartridge into or from a drive operating the cartridge.

10. The recording medium storing the computer program according to claim 9, the computer program causing the computer to further execute the step of controlling a mechanism of locking the cell unit by a mechanism preventing the cell unit from being pulled out of the rack and, when pulling out the cell unit, unlocking the cell unit.

* * * * *